(12) United States Patent
Zheng et al.

(10) Patent No.: US 11,996,911 B2
(45) Date of Patent: May 28, 2024

(54) CHANNEL STATE INFORMATION FEEDBACK METHOD AND APPARATUS

(71) Applicant: ZTE CORPORATION, Shenzhen (CN)

(72) Inventors: Guozeng Zheng, Shenzhen (CN); Hao Wu, Shenzhen (CN); Yong Li, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 143 days.

(21) Appl. No.: 17/625,317

(22) PCT Filed: May 29, 2020

(86) PCT No.: PCT/CN2020/093527
§ 371 (c)(1),
(2) Date: Jan. 6, 2022

(87) PCT Pub. No.: WO2021/004193
PCT Pub. Date: Jan. 14, 2021

(65) Prior Publication Data
US 2022/0271803 A1  Aug. 25, 2022

(30) Foreign Application Priority Data

Jul. 9, 2019 (CN) .......................... 201910615960.1

(51) Int. Cl.
*H04K 1/10* (2006.01)
*H04B 7/0417* (2017.01)
(Continued)

(52) U.S. Cl.
CPC ......... *H04B 7/0417* (2013.01); *H04B 7/0456* (2013.01)

(58) Field of Classification Search
CPC ... H04B 7/0417; H04B 7/0456; H04B 7/0636
(Continued)

(56) References Cited

U.S. PATENT DOCUMENTS

2019/0109626 A1    4/2019  Park et al.
2022/0239360 A1*   7/2022  Faxér ................... H04B 7/0636

FOREIGN PATENT DOCUMENTS

CN    108292986 A    7/2018
CN    108616346 A   10/2018
(Continued)

OTHER PUBLICATIONS

U.S. Appl. No. 62/843,048, filed Oct. 27, 2018.*
(Continued)

*Primary Examiner* — Phuong Phu
(74) *Attorney, Agent, or Firm* — Morgan, Lewis & Bockius LLP

(57) ABSTRACT

Provided are a capability information feedback method and apparatus, and a channel state information feedback method and apparatus. The capability information feedback method comprises: transmitting, by a first communication node, capability information to a second communication node, where the capability information is used for indicating a capability of the first communication node; and receiving, by the first communication node, parameter signaling which is transmitted by the second communication node and corresponds to the capability of the first communication node. Through the method, the first communication node feeds the capability information supported by the first communication node back to the second communication node so that the second communication node can perform scheduling based on the capability of the first communication node, thereby reducing the system overhead and improving the system performance.

13 Claims, 4 Drawing Sheets

A first communication node receives parameter signaling of a second communication node, where the parameter signaling includes configuration information for calculating a channel state information report, a channel for transmitting the first-type signaling, and a size of a resource for transmitting the first-type signaling — S302

The first communication node calculates channel state information and transmits first-type signaling to the second communication node, where a resource for transmitting the first-type signaling is less than a resource required for transmitting actual channel state information, and partial pre-coding information is discarded according to a priority order — S304

(51) Int. Cl.
*H04B 7/0456* (2017.01)
*H04L 27/28* (2006.01)

(58) Field of Classification Search
USPC .................. 375/346, 260, 259, 285, 284
See application file for complete search history.

(56) References Cited

FOREIGN PATENT DOCUMENTS

| CN | 111082839 A | 4/2020 |
|---|---|---|
| WO | WO 2017/061822 A1 | 4/2017 |
| WO | WO-2019062217 A1 | 4/2019 |
| WO | WO-2020225642 A1 | 11/2020 |

OTHER PUBLICATIONS

Ericsson, "On CSI omission procedure", 3GPP TSG RAN WG1 Meeting RAN1 #97 R1-1907076, May 17, 2019 (May 17, 2019), sections 1-5.

Huawei et al., "On UE capability reporting for DFT-based compression codebook", *3GPP TSG RAN WG1 Meeting* #97 R1-1906035, May 17, 2019 (May 17, 2019), sections 1-3.

Intel Corporation, "On CSI Enhancements for MU-MIMO", *3GPP TSG RAN WG1* #96B R1-1904312, Apr. 12, 2019 (Apr. 12, 2019), sections 1-3.

International Search Report for Application No. PCT/CN2020/093527, dated Aug. 26, 2020, 6 pages including English translation.

Samsung, "CSI enhancement for MU-MIMO", *3GPP TSG RAN WG1 meeting* #96bis R1-1904447, Apr. 12, 2019 (Apr. 12, 2019), sections 1-4.

Samsung, "Feature lead summary for MU-MIMO CSI", *3GPP TSG RAN WG1* 96bis R1-1904448, Apr. 16, 2019 (Apr. 16, 2019), sections 1-3.

Vivo, "Further discussion on type II CSI compression and feedback for high rank extension", 3GPP TSG RAN WG1#96bis R1-1904095, Apr. 7, 2019.

LG Electronics, "Discussion on overhead reduction for Type II codebook", 3GPP TSG RAN WG1 #98bis R1-1910581, Oct. 5, 2019.

Extended European Search Report of Application No. 20837596, dated Jun. 26, 2023, 13 pages.

Spreadtrum Communications, "Discussion on Type II CSI overhead reduction", 3GPP TSG RAN WG1 Meeting #96bis R1-1904780, Xi'an, China, Apr. 8-12, 2019.

Korean Office Action for Application No. 10-2022-7003636, dated Feb. 20, 2024, 9 pages including English translation.

Chinese Office Action for Application No. 201910615960.1, dated Jan. 30, 2024, 10 pages including English translation.

Chinese Search Report for Application No. 201910615960.1, dated Jan. 29, 2024, 9 pages including English translation.

* cited by examiner

CHANNEL STATE INFORMATION FEEDBACK METHOD AND APPARATUS

CROSS-REFERENCES TO RELATED APPLICATIONS

This application is a national stage application filed under 35 U.S.C. 371 based on International Patent Application No. PCT/CN2020/093527, filed on May 29, 2020, which claims priority to Chinese Patent Application No. 201910615960.1, filed with the CNIPA on Jul. 9, 2019, disclosures of which are incorporated herein by reference in their entireties.

TECHNICAL FIELD

The present disclosure relates to the field of communication and, specifically, to a capability information feedback method and apparatus, and a channel state information feedback method and apparatus.

BACKGROUND

In a multiple-input and multiple-output (MIMO) wireless communication system, precoding or beamforming is performed on multiple transmit antennas, thereby achieving the purpose of improving transmission efficiency and reliability. In order to implement high-performance precoding or beamforming, a precoding matrix or a beamforming vector needs to be well matched with a channel, which requires that a transmitter can smoothly obtain channel state information (CSI). Therefore, CSI feedback is the key technology for implementing high-performance precoding or beamforming in the MIMO system.

However, in the process of CSI feedback, feeding back a quantized channel matrix brings relatively large overhead. Since a base station cannot know the rank actually fed back by a terminal, the resources allocated by the base station and used for feeding back the CSI may be insufficient, and thus the terminal needs to discard partial channel state information according to an agreed criterion. In addition, the computational complexity of high-performance precoding is high, and different types of terminals have different computing capabilities. Therefore, for the convenience of the scheduling of the base station, the terminal needs to feed back the capability information supported by the terminal itself.

SUMMARY

Embodiments of the present disclosure provide a capability information feedback method and apparatus, and a channel state information feedback method and apparatus, to at least solve the problem that in the process of CSI feedback, feeding back a quantized channel matrix brings relatively large feedback overhead in the related art.

The quantized CSI feedback technology is an important part of MIMO technology. In a conventional wireless communication system, discrete Fourier transform (DFT) vectors or variations of DFT vectors are usually used, such as a Kronecker product of multiple DFT vectors, or cascaded DFT vectors, or cascaded DFT vectors subjected to phase adjustment. A terminal reports precoding indication information in the above-mentioned forms to a base station through quantized feedback. Such types of precoding codebooks may be classified as first-type codebooks. Although such codebooks have small overhead, the CSI quantization precision is low and the performance is limited. For another type of codebooks, DFT vectors or the Kronecker products of DFT vectors are linearly weighted and combined, and the weighted and combined vectors are referred to as codebook basis vectors. The information related to the codebook basis vectors and the amplitude and phase information of a weighting coefficient are fed back to the base station as precoding indication information. Such precoding codebooks may be classified as second-type codebooks. In addition, the precoding codebooks in adjacent frequency domain units and obtained by use of the second-type codebook have a correlation, and with such correlation, the second-type codebook may be compressed by using a DFT matrix in the frequency domain to further reduce the overhead of the second-type codebook. Such a compressed codebook is referred to as the second-type frequency domain compressed codebook. The specific implementation method is as follows.

The terminal usually feeds back rank information (RI) to indicate the layer that the terminal feeds back. The second-type frequency domain compressed codebook of a certain layer may be expressed as:

$$W = W_1 \tilde{W}_2 W_f^H.$$

In the above formula, $W_1$ is a spatial basis vector, the dimension of $W_1$ is $2N_1N_2 \times 2L$, and the form $W_1$ is:

$$W_1 = \begin{bmatrix} v_0 \ v_1 \ \cdots \ v_{L-1} & 0 \\ 0 & v_0 \ v_1 \ \cdots \ v_{L-1} \end{bmatrix}.$$

In the above formula, $2N_1N_2$ denotes the number of ports for reference signals, $N_1$ denotes the number of ports for horizontal reference signals, $N_2$ denotes the number of ports for vertical reference signals, and coefficient 2 represents dual polarization. The L ($L \in \{2,4,6\}$) first basis vectors $v_0, v_1, \ldots, v_{L-1}$ are orthogonal to each other in the form of:

$$p_m = \begin{bmatrix} 1 & e^{j\frac{2\pi m}{O_2 N_1}} & \cdots & e^{j\frac{2\pi m(N_1-1)}{O_2 N_1}} \end{bmatrix}^T; m = 0, \ldots, N_1 O_1 - 1$$

$$q_l = \begin{bmatrix} 1 & e^{j\frac{2\pi l}{O_2 N_2}} & \cdots & e^{j\frac{2\pi l(N_2-1)}{O_2 N_2}} \end{bmatrix}^T; l = 0, \ldots, N_2 O_2 - 1$$

$$v_i = p_m \otimes q_l; i = 0, \ldots, L-1$$

The symbol $\otimes$ represents the Kronecker product, and $O_1$ and $O_2$ are the oversampling factor. In general, the information in $W_1$ is fed back by a form of wideband, that is, for different frequency domain units and different layers over the whole CSI feedback bandwidth, the information in $W_1$ is the same. $W_f$ represents the frequency domain basis vector, the selection of $W_f$ at each layer is independent, and the dimension of $W_f$ is $N_3 \times M$.

$$W_f = [f_0 f_1 \ldots f_{M-1}]$$

In the above formula, $N_3$ denotes the number of precoding sub-bands, $N_3 = R \times N_{SB}$ (R=1 or 2), and $N_{SB}$ denotes the number of channel quality indicator (CQI) sub-bands. The number M of the second basis vectors is determined by parameters P and R, and $$M = \left\lceil p \frac{N_3}{R} \right\rceil.$$

When RI=1 or 2, p=$v_0$, and when RI=3 or 4, p=$y_0$, where $$(v_0, y_0) \in \left\{ \left(\frac{1}{4}, \frac{1}{8}\right), \left(\frac{1}{4}, \frac{1}{4}\right), \left(\frac{1}{2}, \frac{1}{4}\right) \right\}.$$

The M second basis vectors $f_0, f_1, \ldots, f_{M-1}$ are orthogonal to each other in the form of:

$$u_n = \begin{bmatrix} 1 & e^{j\frac{2\pi n}{N_1}} & \ldots & e^{j\frac{2\pi n(N_3-1)}{N_3}} \end{bmatrix}^T$$

$$f_m = u_n; m = 0, 1, \ldots, M-1.$$

If $N_3 \leq 19$, $n \in \{0, 1, \ldots, N_3-1\}$. In this case, the second basis vectors may be selected from the set having a size of $N_3$. If $N_3 > 19$, $n \in \mod\{(n_0, n_0+1, \ldots, n_0+N'_3-1), N_3\}$ ($N'_3 = \lceil \alpha M \rceil$, where the scale factor $$\alpha \in \left\{\frac{3}{2}, 2, \frac{5}{2}, 3\right\}.$$

In this case, the second basis vectors may be selected from a set having a size of $N'_3$.

$\tilde{W}_2$ is the weighting coefficients of the first basis vector and the second basis vector, the dimension of $\tilde{W}_2$ is 2L×M, and the amplitude and phase of $\tilde{W}_2$ need to be subjected to quantized feedback. Rows 1 to L of $\tilde{W}_2$ are referred to as a first antenna port group; The rows (L+1) to 2L of $\tilde{W}_2$ are a second antenna port group. $\tilde{W}_2$ is subjected to quantized feedback in the following manner. First, the index position of a weighting coefficient reference amplitude of a weighting coefficient is found, and the amplitude and phase of the weighting coefficient corresponding to the index position are normalized to 1 and 0 respectively. Through some mathematical operations, the index position is located in the first column of $\tilde{W}_2$ by default. The antenna port group at which the index position of the weighting coefficient reference amplitude is located is referred to as the strong polarization direction, and accordingly, another antenna port group is referred to as the weak polarization direction. Then, the amplitude of the weighting coefficients in the strong polarization direction is subjected to differential quantization with 1 as a reference. Finally, a quantization reference amplitude is determined in the weighting coefficients of the weak polarization direction, and the amplitude of the weighting coefficients in the weak polarization direction is subjected to differential quantization with the quantization reference amplitude as a reference. The quantization overhead of the quantization reference amplitude is 4 bits, the quantization overhead of the amplitude of each weighting coefficient is 3 bits, and the quantization overhead of the phase of each weighting coefficient is 3 bits or 4 bits.

Since the amplitude of many weighting coefficients is likely to be quantized to 0, these weighting coefficients cannot carry channel information. Therefore, only part of weighting coefficients of $\tilde{W}_2$ needs to be selected for feedback, and the weighting coefficients that are not fed back are 0 by default. The base station configures the parameter β, and then $K_0 = \lceil \beta \cdot 2LM \rceil$, where $$\beta \in \left\{\frac{1}{4}, \frac{1}{2}, \frac{3}{4}\right\}.$$

When the RI fed back by the terminal is 1, the total number of weighting coefficients fed back cannot exceed $K_0$. When the RI fed back by the terminal is 2 or 3 or 4, the total number of weighting coefficients fed back at all layers cannot exceed $2K_0$. The selected index position of the weighting coefficient is indicated by using the bitmap.

In general, for the feedback of precoding information, the terminal needs to feed back the selection indication of L first basis vectors, the selection indication of M second basis vectors of each layer, and the weighting coefficient information of each layer. The weighting coefficient information includes bitmap information, amplitude information of a weighting coefficient, amplitude information of weighting coefficients, an index position of a weighting coefficient reference amplitude, and a quantized reference amplitude.

Since the base station cannot know the rank actually fed back by the terminal, the resources allocated by the base station for feeding back the CSI may be insufficient, and thus the terminal needs to discard partial channel state information according to an agreed criterion. In addition, the computational complexity of high-performance precoding is high, and different types of terminals have different computing capabilities. Therefore, it is necessary for the terminal to feed back the capability information supported by the terminal itself for the convenience of the scheduling of the base station. There are many configurable parameters for high-performance precoding. In order to avoid the configuration of too many high-performance parameters, the base station may configure indexes of some parameter combinations to reduce signaling overhead. The present disclosure aims to solve the above problems.

According to embodiments of the present disclosure, a capability information feedback method is provided. The capability information feedback method includes the following steps. A first communication node transmits capability information to a second communication node, where the capability information is used for indicating a capability of the first communication node. The first communication node receives parameter signaling which is transmitted by the second communication node and corresponds to the capability of the first communication node.

The capability information includes at least one of: the maximum number of ports for a reference signal, the maximum number of reference resources in each frequency band, the maximum supported sum of all ports of reference signals in each frequency band, whether to support a sub-band channel state information feedback, the maximum number of supported layers, the maximum number of supported first basis vectors, the maximum number of supported second basis vectors, the maximum size of a supported optional set of second basis vectors, the maximum number of supported channel quality indicator (CQI) sub-bands, the maximum number of sub-bands supporting precoding, the maximum supported feedback proportion of weighting coefficients, the magnitude of a product of the maximum number of supported first basis vectors and the maximum number of supported second basis vectors, the number of channel state information processing units (CPUs), or the maximum number of CPUs that are simultaneously occupied by one channel state information report.

The number of basis vectors contained in the optional set of second basis vectors is greater than the number of second basis vectors, and the second basis vectors are selected from the optional set of second basis vectors.

The number of CPUs is the number of channel state information processing units of the first communication node, where the channel state information processing unit is configured to reflect the capability of the first communication node to process channel state information.

The parameter signaling includes configuration information for calculating a channel state information report, a channel carrying a channel state information report, and a size of a resource of the channel carrying the channel state information report; where the channel carrying the channel state information report includes at least one of: one or more control channels, or a shared channel.

The configuration information for calculating the channel state information report includes at least one of: a reference resource set for calculating a channel state information report, a reference signal resource for calculating a channel state information report, a maximum rank that can be fed back, the number of first basis vectors, a sub-band required to feed back a CQI, a size of a precoding sub-band, a parameter related to the number of second basis vectors, a feedback proportion of a weighting coefficient, a size of an optional set of second basis vectors, or the number of CPUs that simultaneously occupied by one channel state information report; where the parameter related to the number of second basis vectors is used for determining the number of second basis vectors.

When the maximum rank that can be fed back is not configured in the configuration information for calculating the channel state information report, the maximum rank that can be fed back is the maximum number of supported layers in the capability information of the first communication node.

The configuration information for calculating the channel state information report cannot exceed the capability of the first communication node.

The parameter signaling indicates partial parameter information by using an index value.

The partial parameter information includes at least one of: the number of first basis vectors, a parameter related to the number of second basis vectors, a feedback proportion of weighting coefficients, or a scale factor.

The index value indicates the partial parameter information by using an index list mutually agreed by the first communication node and the second communication node.

The index list is one index list or multiple index lists.

For the multiple index lists, the first communication node determines which list to use through a specific parameter contained in the parameter signaling.

The specific parameter includes at least one of: the number of ports for a reference signal, a maximum rank that can be fed back, or the number of precoding sub-bands.

The embodiments of the present disclosure further provide a channel state information feedback method. The channel state information feedback method includes the following step. A first communication node calculates channel state information and transmits first-type signaling to a second communication node, where a resource for transmitting the first-type signaling is less than a resource required for transmitting actual channel state information, and partial precoding information is discarded according to a priority order.

Before the first-type signaling is transmitted to the second communication node, the method further includes the following step. The first communication node receives parameter signaling of the second communication node, where the parameter signaling includes configuration information for calculating a channel state information report, a channel for transmitting the first-type signaling, and a size of a resource for transmitting the first-type signaling.

The first-type signaling includes one or more channel state information reports, where the channel state information report includes at least one of: rank indication information, modulation and coding information, layer indication information, reference signal resource indication information, or precoding information.

The precoding information includes at least one of: the total number of weighting coefficients at all layers, a selection indication of a first basis vector, a selection indication of a second basis vector at each layer, or weighting coefficient information of each layer; where the weighting coefficients are a weighting coefficient of a first basis vector and a weighting coefficient of a second basis vector, and the weighting coefficient information of each layer includes: bitmap information, amplitude information of a weighting coefficient, phase information of a weighting coefficient, an index position of a weighting coefficient reference amplitude, or a quantized reference amplitude.

The amplitude information of the weighting coefficient and the phase information of the weighting coefficient are information of a to-be-fed-back weighting coefficient after quantized, and the bitmap information is used for indicating an index position of a to-be-fed-back weighting coefficient.

One channel state information report consists of two parts, including a first part of channel state information and a second part of channel state information; where the size of a resource occupied by the first part of channel state information is fixed, and the first part of channel state information is used for indicating the size of a resource occupied by the second part of channel state information.

The first part of channel state information includes: rank indication information and the total number of weighting coefficients at all layers in the second part of channel state information.

The second part of channel state information includes: a selection indication of a first basis vector, a selection indication of a second basis vector at each layer, or weighting coefficient information of each layer.

The bitmap information, the amplitude information of the weighting coefficients, and the phase information of the weighting coefficients are each ordered according to a priority principle. The priority principle adopts one of the following manners: priorities from high to low are a layer index, an index of a first basis vector, and an index of a second basis vector; priorities from high to low are a layer index, an index of a second basis vector, and an index of a first basis vector; priorities from high to low are an index of a first basis vector, an index of a second basis vector, and a layer index; priorities from high to low are an index of a second basis vector, an index of a first basis vector, and a layer index; priorities from high to low are an index of a first basis vector, an index of a second basis vector, an antenna port group index, and a layer index; priorities from high to low are an index of a second basis vector, an index of a first basis vector, an antenna port group index, and a layer index; priorities from high to low are an antenna port group index, an index of a first basis vector, an index of a second basis vector, and a layer index; or priorities from high to low are an antenna port group index, an index of a second basis vector, an index of a first basis vector, and a layer index.

The actual channel state information is information calculated by the first communication node according to the configuration information for calculating the channel state information report.

The partial precoding information is discarded according to the priority order in one of the following manners: discarding amplitude information of part of weighting coefficients having a lowest priority and phase information of the part of the weighting coefficients having the lowest priority to enable a resource for transmitting first signaling to be sufficient to transmit remaining actual channel state information; or discarding amplitude information of the part of the weighting coefficients having the lowest priority, phase information of the part of the weighting coefficients having the lowest priority, and part of bitmap information having the lowest priority to enable a resource for transmitting first signaling to be sufficient to transmit remaining actual channel state information.

The embodiments of the present disclosure further provide a parameter signaling transmitting method. The parameter signaling transmitting method includes the following steps. A second communication node receives capability information which is transmitted by a first communication node and used for indicating a capability of the first communication node. The second communication node transmits parameter signaling which corresponds to the capability of the first communication node to the first communication node.

The parameter signaling includes configuration information for calculating a channel state information report, a channel carrying a channel state information report, and a size of a resource of the channel carrying the channel state information report; where the channel carrying the channel state information report includes at least one of: one or more control channels, or a shared channel.

The configuration information for calculating the channel state information report includes at least one of: a reference resource set for calculating a channel state information report, a reference signal resource for calculating a channel state information report, a maximum rank that can be fed back, the number of first basis vectors, a sub-band required to feed back a CQI, a size of a pre-coding sub-band, a parameter related to the number of second basis vectors, a feedback proportion of weighting coefficients, a size of an optional set of second basis vectors, or the number of CPUs that simultaneously occupied by one channel state information report; where the parameter related to the number of second basis vectors is used for determining the number of second basis vectors.

The parameter signaling indicates partial parameter information by using an index value.

The partial parameter information includes at least one of: the number of first basis vectors, a parameter related to the number of second basis vectors, a feedback proportion of weighting coefficients, or a scale factor.

The index value indicates the partial parameter information by using an index list mutually agreed by the first communication node and the second communication node.

The index list is one index list or multiple index lists.

For the multiple index lists, the first communication node determines which list to use through a specific parameter contained in the parameter signaling.

The specific parameter includes at least one of: the number of ports for a reference signal, a maximum rank that can be fed back, or the number of precoding sub-bands.

The embodiments of the present disclosure further provide a channel state information feedback apparatus. The channel state information feedback apparatus is located in the first communication node and includes a transmitting module and a receiving module. The transmitting module is configured to transmit capability information to a second communication node, where the capability information is used for indicating a capability of the first communication node. The receiving module is configured to receive parameter signaling which is transmitted by the second communication node and corresponds to the capability of the first communication node.

The embodiments of the present disclosure further provide a channel state information feedback apparatus. The channel state information feedback apparatus is located in the first communication node and includes a calculation module. The calculation module is configured to calculate channel state information and transmit first-type signaling to a second communication node; where a resource for transmitting the first-type signaling is less than a resource required for transmitting actual channel state information, and partial precoding information is discarded according to a priority order.

The apparatus further includes a receiving module. The receiving module is configured to, before the transmitting module transmits the first-type signaling, receive parameter signaling of the second communication node, where the parameter signaling is used for indicating a parameter for calculating a channel state information report, a channel for transmitting the first-type signaling, and a size of a resource for transmitting the first-type signaling.

The embodiments of the present disclosure further provide a parameter signaling transmitting apparatus. The parameter signaling transmitting apparatus is located in the second communication node and includes a receiving module and a transmitting module. The receiving module is configured to receive capability information which is transmitted by a first communication node and used for indicating a capability of the first communication node. The transmitting module is configured to transmit parameter signaling which corresponds to the capability of the first communication node to the first communication node.

According to another embodiment of the present disclosure, a storage medium is further provided. The storage medium has a computer program stored thereon, where the computer program is configured to, when executed, perform the steps in the preceding method embodiments.

According to another embodiment of the present disclosure, an electronic apparatus is further provided. The electronic apparatus includes a memory and a processor. The memory has a computer program stored thereon, and the processor is configured to execute the computer program to perform the steps in the preceding method embodiments.

In the preceding embodiments of the present disclosure, the first communication node feeds the capability information supported by the first communication node back to the second communication node so that the second communication node can perform scheduling based on the capability of the first communication node. In addition, since there are many configurable parameters for high-performance precoding, in order to avoid the configuration of too many high-performance parameters, the second communication node can configure indexes of some parameter combination, thereby reducing signaling overhead.

BRIEF DESCRIPTION OF DRAWINGS

The drawings described herein are used to provide a further understanding of the present disclosure, and form a part of the present disclosure. The example embodiments of the present disclosure and descriptions thereof are used to explain the present disclosure and not to form improper limits to the present disclosure. In the drawings.

DETAILED DESCRIPTION

Hereinafter, the present disclosure will be described in detail with reference to drawings and in conjunction with embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Figure 1:
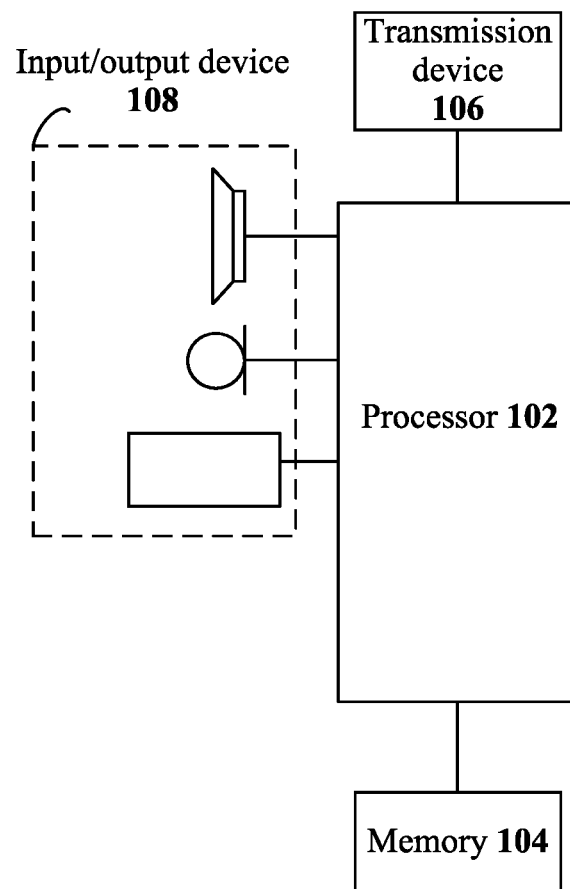
FIG. 1 is a structural diagram of a mobile terminal according to an embodiment of the present disclosure.

The method embodiment provided by Embodiment one of the present application may be performed in a mobile terminal or another similar communication apparatus. The method to be performed in the mobile terminal is used as an example. FIG. 1 is a structural diagram of a mobile terminal according to an embodiment of the present disclosure. As shown in FIG. 1, the mobile terminal may include one or more (merely one is shown in FIG. 1) processors 102 (the processors 102 may include, but are not limited to, a microprocessor such as a microcontroller unit (MCU), a programmable logic device such as a field-programmable gate array (FPGA), and other processing apparatuses), and a memory 104 used for storing data. Optionally, the preceding mobile terminal may further include a transmission device 106 for a communication function and an input/output device 108. It is to be understood by those having ordinary skill in the art that the structure shown in FIG. 1 is merely illustrative and not intended to limit the structure of the preceding mobile terminal. For example, the mobile terminal 10 may further include more or fewer components than the components shown in FIG. 1, or may have a configuration different from the configuration shown in FIG. 1.

The memory 104 may be configured to store a computer program, such as a software program and a module of application software, for example, a computer program corresponding to the method embodiment of the present disclosure. The processors 102 execute the computer program stored in the memory 104 to perform various functional applications and data processing, that is, to perform the preceding method. The memory 104 may include a high-speed random-access memory and may further include a nonvolatile memory such as one or more magnetic storage apparatuses, flash memories, or other nonvolatile solid-state memories. In some examples, the memory 104 may further include memories that are remotely disposed with respect to the one or processors 102. These remote memories may be connected to the mobile terminal 10 via a network. The examples of the preceding network include, but are not limited to, the Internet, an intranet, a local area network, a mobile communication network, and a combination thereof.

The transmission device 106 is configured to receive or transmit data via a network. Specific examples of the preceding network may include a wireless network provided by a communication provider of the mobile terminal 10. In an example, the transmission device 106 includes a network interface controller (NIC) which may be connected to other network devices via a base station and thus can communicate with the Internet. In an example, the transmission device 106 may be a radio frequency (RF) module which is configured to communicate with the Internet in a wireless way.

Figure 2:
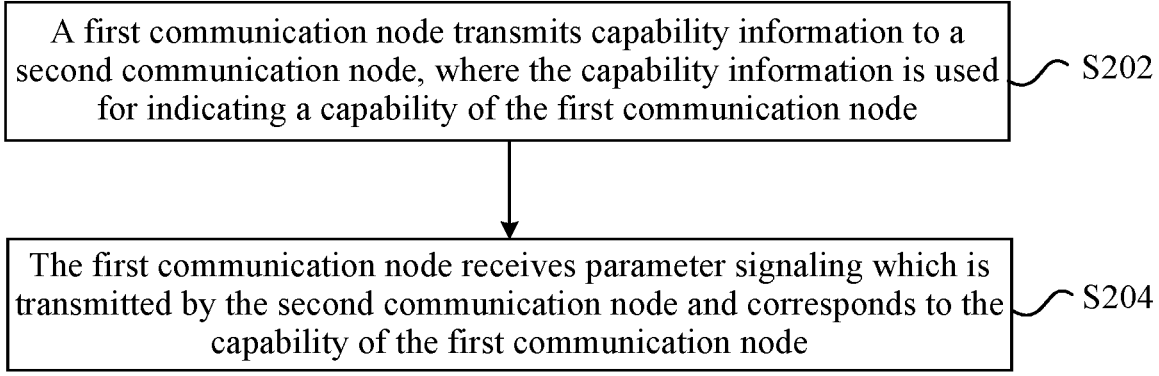
FIG. 2 is a flowchart of a capability information feedback method according to an embodiment of the present disclosure.

The embodiment provides a capability information feedback method executed on the preceding mobile terminal. FIG. 2 is a flowchart of a capability information feedback method according to an embodiment of the present disclosure. In this embodiment, the first communication node may be a mobile terminal, and the second communication node may be a base station. As shown in FIG. 2, the method includes the following.

In S202, a first communication node transmits capability information to a second communication node, where the capability information is used for indicating a capability of the first communication node.

In S204, the first communication node receives parameter signaling which is transmitted by the second communication node and corresponds to the capability of the first communication node.

Figure 3:
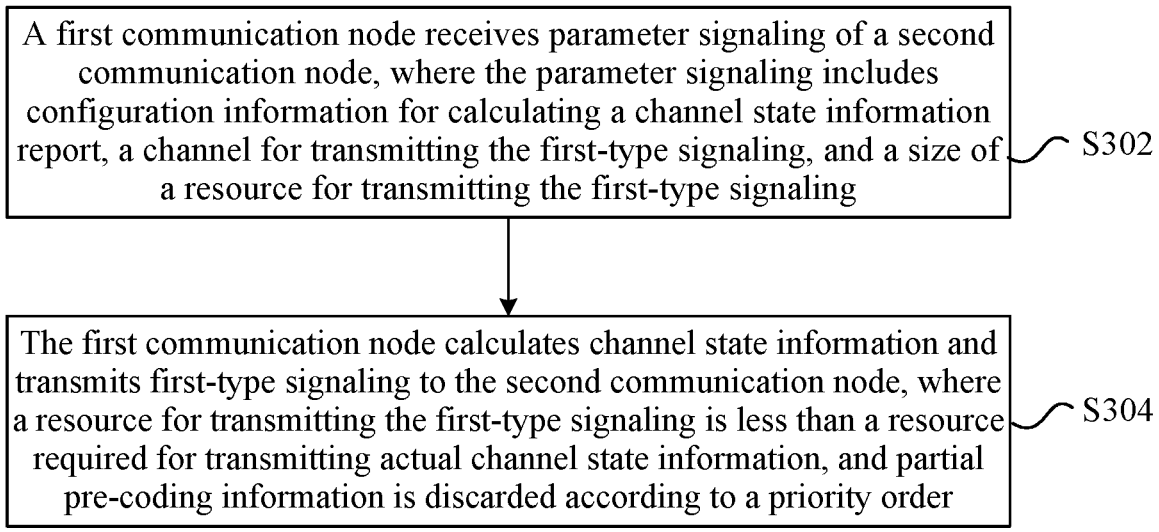
FIG. 3 is a flowchart of a channel state information feedback method according to an embodiment of the present disclosure.

The embodiment provides a channel state information feedback method. FIG. 3 is a flowchart of the embodiment of the present disclosure. In the embodiment, the first communication node may be a mobile terminal, and the second communication node may be a base station. As shown in FIG. 3, the method includes the following.

In S304, the first communication node calculates channel state information and transmits first-type signaling to the second communication node, where a resource for transmitting the first-type signaling is less than a resource required for transmitting actual channel state information, and partial pre-coding information is discarded according to a priority order.

Before S304, the method further includes S302. In S302, the first communication node receives parameter signaling of the second communication node, where the parameter signaling includes configuration information for calculating a channel state information report, a channel for transmitting the first-type signaling, and a size of a resource for transmitting the first-type signaling.

Figure 4:
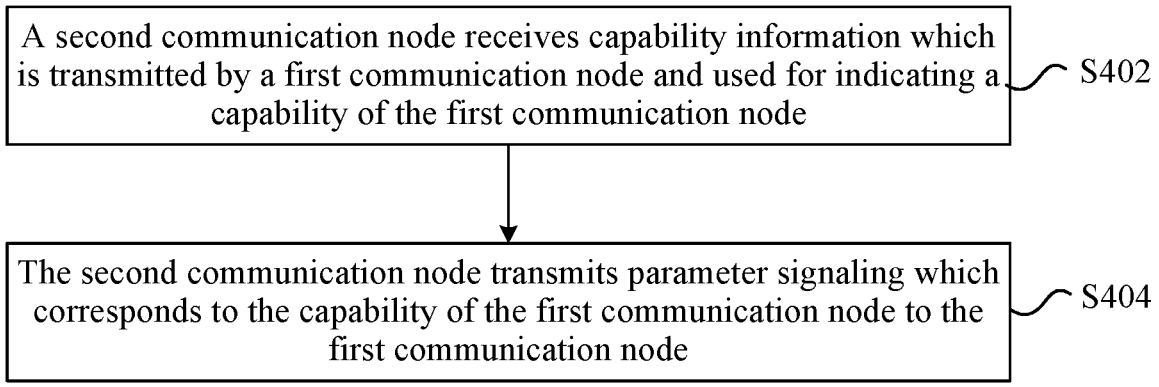
FIG. 4 is a flowchart of a capability information feedback method according to an embodiment of the present disclosure.

The embodiment provides a parameter signaling transmitting method. FIG. 4 is a flowchart of the embodiment of the present disclosure. In the embodiment, the first communication node may be a mobile terminal, and the second communication node may be a base station. As shown in FIG. 4, the method includes the steps described below.

In S402, the second communication node receives capability information which is transmitted by the first communication node and used for indicating a capability of the first communication node.

In S404, the second communication node transmits parameter signaling which corresponds to the capability of the first communication node to the first communication node.

A detailed description will be given below through the specific embodiments from four aspects, that is, the reporting mode of terminal capability information, the configuration mode of base station parameter signaling, the ordering mode of bitmap information, amplitude information of a weighting coefficient and phase information of a weighting coefficient, and the mode of discarding partial precoding information.

1. Reporting Mode of Terminal Capability Information

As described previously, since the computational complexity of high-precision channel state information is high and different types of terminals have different computing capabilities, the base station needs to know the capability information of the terminal. In the following embodiments of the present disclosure, the terminal may feed back the capability information in the following manner.

The terminal feeds back the capability information such as the maximum number of ports for a reference signal, the maximum number of reference resources in each frequency band, the maximum supported sum of all ports of reference signals in each frequency band, whether to support a sub-band channel state information feedback, the maximum number of supported layers, and other capability information of the terminal. In the embodiment, some other capability information of the terminal may be fed back by using one of the following implementation modes.

Implementation Mode 1-1

The number L of first basis vectors that can be processed under different numbers of ports for the reference signal is the capability information of the terminal. As shown in Table 1, in an embodiment, under a specific number of ports, the terminal, according to the processing capability of the terminal itself, selects one from Terminal Capability 1, Terminal Capability 2, and Terminal Capability 3 and feeds back the selected terminal capability to the base station.

TABLE 1

| Port No. | Terminal Capability 1 | Terminal Capability 2 | Terminal Capability 3 |
|---|---|---|---|
| 4 | Support $L = 2$ | Not support | Not support |
| 8 | Support $L = 2$ | Support $L = 2$ and $L = 4$ | Not support |
| 12 | Support $L = 2$ | Support $L = 2$ and $L = 4$ | Not support |
| 16 | Support $L = 2$ | Support $L = 2$ and $L = 4$ | Not support |
| 24 | Support $L = 2$ | Support $L = 2$ and $L = 4$ | Not support |
| 32 | Support $L = 2$ | Support $L = 2$ and $L = 4$ | Support $L = 2$, $L = 4$, and $L = 6$ |

In another embodiment, the terminal feeds back the maximum number L of first basis vectors that can be supported under different numbers of ports for the reference signal.

Implementation Mode 1-2

The number L of first basis vectors and the number $N_3$ of precoding sub-bands that can be processed under different numbers of ports for the reference signal are the capability information of the terminal. In an embodiment, as shown in Table 2, under a specific number of ports, the terminal, according to the processing capability of the terminal itself, selects one from Terminal Capability (L) 1, Terminal Capability (L) 2, and Terminal Capability (L) 3, then selects one from Terminal Capability ($N_3$) 1 and Terminal Capability ($N_3$) 2, and feeds back the selected terminal capabilities to the base station.

TABLE 2

| Port No. | Terminal Capability (L) 1 | Terminal Capability (L) 2 | Terminal Capability (L) 3 | Terminal Capability ($N_3$) 1 | Terminal Capability ($N_3$) 3 |
|---|---|---|---|---|---|
| 4 | Support $L = 2$ | Not support | Not support | Support $N_3 \leq 19$ | Not limit the selection of the value of $N_3$ |
| 8 | Support $L = 2$ | Support $L = 2$ and $L = 4$ | Not support | | |
| 12 | Support $L = 2$ | Support $L = 2$ and $L = 4$ | Not support | | |
| 16 | Support $L = 2$ | Support $L = 2$ and $L = 4$ | Not support | | |
| 24 | Support $L = 2$ | Support $L = 2$ and $L = 4$ | Not support | | |
| 32 | Support $L = 2$ | Support $L = 2$ and $L = 4$ | Support $L = 2$, $L = 4$, and $L = 6$ | | |

In another embodiment, as shown in Table 3, under a specific number of ports, the terminal, according to the processing capability of the terminal itself, selects one from Terminal Capability (L) 1, Terminal Capability (L) 2, and Terminal Capability (L) 3, then selects one from Terminal Capability ($N_3$) 1, Terminal Capability ($N_3$) 2, and Terminal Capability ($N_3$) 3, and feeds back the selected terminal capabilities to the base station.

TABLE 3

| Port No. | Terminal Capability (L) 1 | Terminal Capability (L) 2 | Terminal Capability (L) 3 | Terminal Capability ($N_3$) 1 | Terminal Capability ($N_3$) 2 | Terminal Capability ($N_3$) 3 |
|---|---|---|---|---|---|---|
| 4 | Support L = 2 | Not support | Not support | Support $N_3 \leq 13$ | Support $N_3 \leq 19$ | Not limit the selection of the value of $N_3$ |
| 8 | Support L = 2 | Support L = 2 and L = 4 | Not support | | | |
| 12 | Support L = 2 | Support L = 2 and L = 4 | Not support | | | |
| 16 | Support L = 2 | Support L = 2 and L = 4 | Not support | | | |
| 24 | Support L = 2 | Support L = 2 and L = 4 | Not support | | | |
| 32 | Support L = 2 | Support L = 2 and L = 4 | Support L = 2, L = 4, and L = 6 | | | |

In another embodiment, the terminal feeds back the maximum number L of first basis vectors that can be supported and the maximum number $N_3$ of precoding sub-bands that can be supported under different numbers of ports for the reference signal.

Implementation Mode 1-3

The number L of first basis vectors, the number $N_3$ of precoding sub-bands, and the number M of second basis vectors that can be processed under different numbers of ports for the reference signal are the capability information of the terminal. In a specific embodiment, as shown in Table 4, under a specific number of ports, the terminal, according to the processing capability of the terminal itself, selects one from Terminal Capability (L) 1, Terminal Capability (L) 2, and Terminal Capability (L) 3, selects one from Terminal Capability ($N_3$) 1 and Terminal Capability ($N_3$) 2, selects one from Terminal Capability (M) 1 and Terminal Capability (M) 2, and feeds back the selected terminal capabilities to the base station.

TABLE 4

| Port No. | Terminal Capability (L) 1 | Terminal Capability (L) 2 | Terminal Capability (L) 3 | Terminal Capability ($N_3$) 1 | Terminal Capability ($N_3$) 2 | Terminal Capability (M) 1 | Terminal Capability (M) 2 |
|---|---|---|---|---|---|---|---|
| 4 | Support L = 2 | Not support | Not support | Support $N_3 \leq 19$ | Not limit the selection of the value of $N_3$ | Support $M \leq 5$ | Not limit the selection of the value of M |
| 8 | Support L = 2 | Support L = 2 and L = 4 | Not support | | | | |
| 12 | Support L = 2 | Support L = 2 and L = 4 | Not support | | | | |
| 16 | Support L = 2 | Support L = 2 and L = 4 | Not support | | | | |
| 24 | Support L = 2 | Support L = 2 and L = 4 | Not support | | | | |
| 32 | Support L = 2 | Support L = 2 and L = 4 | Support L = 2, L = 4, and L = 6 | | | | |

In another embodiment, as shown in Table 5, under a specific number of ports, the terminal, according to the processing capability of the terminal itself, selects one from Terminal Capability (L) 1, Terminal Capability (L) 2, and Terminal Capability (L) 3, selects one from Terminal Capability ($N_3$) 1 and Terminal Capability ($N_3$) 2, selects one from Terminal Capability (M) 1, Terminal Capability (M) 2, and Terminal Capability (M) 3, and feeds back the selected terminal capabilities to the base station.

TABLE 5

| Port No. | Terminal Capability (L) 1 | Terminal Capability (L) 2 | Terminal Capability (L) 3 | Terminal Capability ($N_3$) 1 | Terminal Capability ($N_3$) 2 | Terminal Capability (M) 1 | Terminal Capability (M) 2 | Terminal Capability (M) 3 |
|---|---|---|---|---|---|---|---|---|
| 4 | Support L = 2 | Not support | Not support | Support $N_3 \leq 19$ | Not limit the selection of the value of $N_3$ | Support M ≤ 4 | Support M ≤ 7 | Not limit the selection of the value of M |
| 8 | Support L = 2 | Support L = 2 and L = 4 | Not support | | | | | |
| 12 | Support L = 2 | Support L = 2 and L = 4 | Not support | | | | | |
| 16 | Support L = 2 | Support L = 2 and L = 4 | Not support | | | | | |
| 24 | Support L = 2 | Support L = 2 and L = 4 | Not support | | | | | |
| 32 | Support L = 2 | Support L = 2 and L = 4 | Support L = 2, L = 4, and L = 6 | | | | | |

In another embodiment, as shown in Table 6, under a specific number of ports, the terminal, according to the processing capability of the terminal itself, selects one from Terminal Capability (L) 1, Terminal Capability (L) 2, and Terminal Capability (L) 3, selects one from Terminal Capability ($N_3$) 1, Terminal Capability ($N_3$) 2, and Terminal Capability ($N_3$) 3, selects one from Terminal Capability (M) 1 and Terminal Capability (M) 2, and feeds back the selected terminal capabilities to the base station.

TABLE 6

| Port No. | Terminal Capability (L) 1 | Terminal Capability (L) 2 | Terminal Capability (L) 3 | Terminal Capability ($N_3$) 1 | Terminal Capability ($N_3$) 2 | Terminal Capability ($N_3$) 3 | Terminal Capability (M) 1 | Terminal Capability (M) (M)2 |
|---|---|---|---|---|---|---|---|---|
| 4 | Support L = 2 | Not support | Not support | Support $N_3 \leq 13$ | Support $N_3 \leq 19$ | Not limit the selection of the value of $N_3$ | Support M ≤ 5 | Not limit the selection of the value of M |
| 8 | Support L = 2 | Support L = 2 and L = 4 | Not support | | | | | |
| 12 | Support L = 2 | Support L = 2 and L = 4 | Not support | | | | | |
| 16 | Support L = 2 | Support L = 2 and L = 4 | Not support | | | | | |
| 24 | Support L = 2 | Support L = 2 and L = 4 | Not support | | | | | |
| 32 | Support L = 2 | Support L = 2 and L = 4 | Support L = 2, L = 4, and L = 6 | | | | | |

In a specific embodiment, as shown in Table 7, under a specific number of ports, the terminal, according to the processing capability of the terminal itself, selects one from Terminal Capability (L) 1, Terminal Capability (L) 2, and Terminal Capability (L) 3, selects one from Terminal Capability ($N_3$) 1, Terminal Capability ($N_3$) 2, and Terminal Capability ($N_3$) 3, selects one from Terminal Capability (M) 1, Terminal Capability (M) 2, and Terminal Capability (M) 3, and feeds back the selected terminal capabilities to the base station.

TABLE 7

| Port No. | Terminal Capability (L) 1 | Terminal Capability (L) 2 | Terminal Capability (L) 3 | Terminal Capability ($N_3$) 1 | Terminal Capability ($N_3$) 2 | Terminal Capability ($N_3$) 3 | Terminal Capability (M) 1 | Terminal Capability (M) 2 | Terminal Capability (M) 3 |
|---|---|---|---|---|---|---|---|---|---|
| 4 | Support L = 2 | Not support | Not support | Support $N_3 \le 13$ | Support $N_3 \le 19$ | Not limit the selection of the value of $N_3$ | Support M ≤ 4 | Support M ≤ 7 | Not limit the selection of the value of M |
| 8 | Support L = 2 | Support L = 2 and L = 4 | Not support | | | | | | |
| 12 | Support L = 2 | Support L = 2 and L = 4 | Not support | | | | | | |
| 16 | Support L = 2 | Support L = 2 and L = 4 | Not support | | | | | | |
| 24 | Support L = 2 | Support L = 2 and L = 4 | Not support | | | | | | |
| 32 | Support L = 2 | Support L = 2 and L = 4 | Support L = 2, L = 4, and L = 6 | | | | | | |

In another embodiment, the terminal feeds back the maximum number L of first basis vectors that can be supported, the maximum number $N_3$ of precoding sub-bands that can be supported, and the maximum number M of second basis vectors that can be supported under different numbers of ports for the reference signal.

Implementation Mode 1-4

The number L of first basis vectors, the number $N_3$ of precoding sub-bands, the number M of second basis vectors, and the feedback proportion β of weighting coefficients, which can be processed under different numbers of ports for the reference signal, are capability information of the terminal. In a specific embodiment, the terminal feeds back the maximum number L of first basis vectors that can be supported, the maximum number $N_3$ of precoding sub-bands that can be supported, the maximum number M of second basis vectors that can be supported, and the maximum feedback proportion β of the weighting coefficients that can be supported under different numbers of ports for the reference signal.

2. Configuration Mode of Base Station Parameter Signaling

In order to reduce the overhead of high-layer signaling, the base station may configure partial parameter information for calculating a channel state information report through the index table. In the following embodiments of the present disclosure, the terminal may obtain partial parameter information for calculating the channel state information report by using one of the following implementation modes.

Implementation Mode 2-1

The configuration of {number L of first basis vectors, parameter p, feedback proportion β of the weighting coefficients} is determined according to the number of ports for the reference signal and the index value.

In a specific embodiment, as shown in Tables 8 and 9, the number of ports for the reference signal in Table 8 is less than 32, and the number of ports for the reference signal in Table 9 is greater than or equal to 32. Whether one of Table 8 and Table 9 is used may be determined according to the number of ports for the reference signal, and then the configuration of {L, ($v_0$, $y_0$), β} or {L, $v_0$, β} may be determined according to the index value.

TABLE 8

| Index value | {L, ($v_0$, $y_0$), β} |
|---|---|
| 0 | {2, (1/4, 1/8), 1/4} |
| 1 | {2, (1/4, 1/8), 1/2} |
| 2 | {2, (1/4, 1/8), 3/4} |
| 3 | {2, (1/4, 1/4), 1/4} |
| 4 | {2, (1/4, 1/4), 1/2} |
| 5 | {2, (1/4, 1/4), 3/4} |
| 6 | {2, (1/2, 1/2), 1/4} |
| 7 | {2, (1/2, 1/2), 1/2} |
| 8 | {2, (1/2, 1/2), 3/4} |
| 9 | {4, (1/4, 1/8), 1/4} |
| 10 | {4, (1/4, 1/8), 1/2} |
| 11 | {4, (1/4, 1/8), 3/4} |
| 12 | {4, (1/4, 1/4), 1/4} |
| 13 | {4, (1/4, 1/4), 1/2} |
| 14 | {4, (1/4, 1/4), 3/4} |
| 15 | {4, (1/2, 1/4), 1/4} |
| 16 | {4, (1/2, 1/4), 1/2} |
| 17 | {4, (1/2, 1/4), 3/4} |

TABLE 9

| Index value | {L, $v_0$, β} |
|---|---|
| 0 | {2, 1/4, 1/4} |
| 1 | {2, 1/4, 1/2} |
| 2 | {2, 1/4, 3/4} |
| 3 | {2, 1/2, 1/4} |
| 4 | {2, 1/2, 1/2} |
| 5 | {2, 1/2, 3/4} |
| 6 | {4, 1/4, 1/4} |
| 7 | {4, 1/4, 1/2} |
| 8 | {4, 1/4, 3/4} |
| 9 | {4, 1/2, 1/4} |
| 10 | {4, 1/2, 1/2} |
| 11 | {4, 1/2, 3/4} |
| 12 | {6, 1/4, 1/4} |
| 13 | {6, 1/4, 1/2} |
| 14 | {6, 1/4, 3/4} |
| 15 | {6, 1/2, 1/4} |

Implementation Mode 2-2

The configuration of {number L of first basis vectors, parameter p, feedback proportion β of the weighting coefficients, scale factor α} is determined according to the number of ports for the reference signal, the number of precoding sub-bands, and the index value.

In an embodiment, as shown in Tables 10, 11, 12, and 13, the number of ports for the reference signal in Table 10 is less than 32 and $N_3 \leq 19$, the number of ports for the reference signal in Table 11 is greater than or equal to 32 and $N_3 \leq 19$, the number of ports for the reference signal in Table 12 is less than 32 and $N_3 > 19$, and the number of ports for the reference signal in Table 13 is greater than or equal to 32 and $N_3 > 19$. Which table is used may be determined according to the number of ports for the reference signal and the number of precoding sub-bands, and then the configuration of $\{L, v_0, \beta\}$ or $\{L, v_0, \beta, \alpha\}$ or $\{L, (v_0, y_0), \beta\}$ or $\{L, (v_0, y_0), \beta, \alpha\}$ may be determined according to the index value. $\alpha_1 < \alpha_2$, and $$\alpha_1, \alpha_2 \in \left\{\frac{3}{2}, 2, \frac{5}{2}, 3\right\}.$$

TABLE 10

| Index value | $\{L, (v_0, y_0), \beta\}$ |
|---|---|
| 0 | $\{2, (1/4, 1/8), 1/4\}$ |
| 1 | $\{2, (1/4, 1/8), 1/2\}$ |
| 2 | $\{2, (1/4, 1/8), 3/4\}$ |
| 3 | $\{2, (1/4, 1/4), 1/4\}$ |
| 4 | $\{2, (1/4, 1/4), 1/2\}$ |
| 5 | $\{2, (1/4, 1/4), 3/4\}$ |
| 6 | $\{2, (1/2, 1/2), 1/4\}$ |
| 7 | $\{2, (1/2, 1/2), 1/2\}$ |
| 8 | $\{2, (1/2, 1/2), 3/4\}$ |
| 9 | $\{4, (1/4, 1/8), 1/4\}$ |
| 10 | $\{4, (1/4, 1/8), 1/2\}$ |
| 11 | $\{4, (1/4, 1/8), 3/4\}$ |
| 12 | $\{4, (1/4, 1/4), 1/4\}$ |
| 13 | $\{4, (1/4, 1/4), 1/2\}$ |
| 14 | $\{4, (1/4, 1/4), 3/4\}$ |
| 15 | $\{4, (1/2, 1/4), 1/4\}$ |
| 16 | $\{4, (1/2, 1/4), 1/2\}$ |
| 17 | $\{4, (1/2, 1/4), 3/4\}$ |

TABLE 11

| Index value | $\{L, v_0, \beta\}$ |
|---|---|
| 0 | $\{2, 1/4, 1/4\}$ |
| 1 | $\{2, 1/4, 1/2\}$ |
| 2 | $\{2, 1/4, 3/4\}$ |
| 3 | $\{2, 1/2, 1/4\}$ |
| 4 | $\{2, 1/2, 1/2\}$ |
| 5 | $\{2, 1/2, 3/4\}$ |
| 6 | $\{4, 1/4, 1/4\}$ |
| 7 | $\{4, 1/4, 1/2\}$ |
| 8 | $\{4, 1/4, 3/4\}$ |
| 9 | $\{4, 1/2, 1/4\}$ |
| 10 | $\{4, 1/2, 1/2\}$ |
| 11 | $\{4, 1/2, 3/4\}$ |
| 12 | $\{6, 1/4, 1/4\}$ |
| 13 | $\{6, 1/4, 1/2\}$ |
| 14 | $\{6, 1/4, 3/4\}$ |
| 15 | $\{6, 1/2, 1/4\}$ |

TABLE 12

| Index value | $\{L, v_0, \beta, \alpha\}$ |
|---|---|
| 0 | $\{2, 1/4, 1/4, \alpha_1\}$ |
| 1 | $\{2, 1/4, 1/4, \alpha_2\}$ |
| 2 | $\{2, 1/4, 1/2, \alpha_1\}$ |
| 3 | $\{2, 1/4, 1/2, \alpha_2\}$ |
| 4 | $\{2, 1/4, 3/4, \alpha_1\}$ |
| 5 | $\{2, 1/4, 3/4, \alpha_2\}$ |
| 6 | $\{2, 1/2, 1/4, \alpha_1\}$ |
| 7 | $\{2, 1/2, 1/4, \alpha_2\}$ |
| 8 | $\{2, 1/2, 1/2, \alpha_1\}$ |
| 9 | $\{2, 1/2, 1/2, \alpha_2\}$ |
| 10 | $\{2, 1/2, 3/4, \alpha_1\}$ |
| 11 | $\{2, 1/2, 3/4, \alpha_2\}$ |
| 12 | $\{4, 1/4, 1/4, \alpha_1\}$ |
| 13 | $\{4, 1/4, 1/4, \alpha_2\}$ |
| 14 | $\{4, 1/4, 1/2, \alpha_1\}$ |
| 15 | $\{4, 1/4, 1/2, \alpha_2\}$ |
| 16 | $\{4, 1/4, 3/4, \alpha_1\}$ |
| 17 | $\{4, 1/4, 3/4, \alpha_2\}$ |
| 18 | $\{4, 1/2, 1/4, \alpha_1\}$ |
| 19 | $\{4, 1/2, 1/4, \alpha_2\}$ |
| 20 | $\{4, 1/2, 1/2, \alpha_1\}$ |
| 21 | $\{4, 1/2, 1/2, \alpha_2\}$ |
| 22 | $\{4, 1/2, 3/4, \alpha_1\}$ |
| 23 | $\{4, 1/2, 3/4, \alpha_2\}$ |

TABLE 13

| Index value | $\{L, v_0, \beta, \alpha\}$ |
|---|---|
| 0 | $\{2, 1/4, 1/4, \alpha_1\}$ |
| 1 | $\{2, 1/4, 1/4, \alpha_2\}$ |
| 2 | $\{2, 1/4, 1/2, \alpha_1\}$ |
| 3 | $\{2, 1/4, 1/2, \alpha_2\}$ |
| 4 | $\{2, 1/4, 3/4, \alpha_1\}$ |
| 5 | $\{2, 1/4, 3/4, \alpha_2\}$ |
| 6 | $\{2, 1/2, 1/4, \alpha_1\}$ |
| 7 | $\{2, 1/2, 1/4, \alpha_2\}$ |
| 8 | $\{2, 1/2, 1/2, \alpha_1\}$ |
| 9 | $\{2, 1/2, 1/2, \alpha_2\}$ |
| 10 | $\{2, 1/2, 3/4, \alpha_1\}$ |
| 11 | $\{2, 1/2, 3/4, \alpha_2\}$ |
| 12 | $\{4, 1/4, 1/4, \alpha_1\}$ |
| 13 | $\{4, 1/4, 1/4, \alpha_2\}$ |
| 14 | $\{4, 1/4, 1/2, \alpha_1\}$ |
| 15 | $\{4, 1/4, 1/2, \alpha_2\}$ |
| 16 | $\{4, 1/4, 3/4, \alpha_1\}$ |
| 17 | $\{4, 1/4, 3/4, \alpha_2\}$ |
| 18 | $\{4, 1/2, 1/4, \alpha_1\}$ |
| 19 | $\{4, 1/2, 1/4, \alpha_2\}$ |
| 20 | $\{4, 1/2, 1/2, \alpha_1\}$ |
| 21 | $\{4, 1/2, 1/2, \alpha_2\}$ |
| 22 | $\{4, 1/2, 3/4, \alpha_1\}$ |
| 23 | $\{4, 1/2, 3/4, \alpha_2\}$ |
| 24 | $\{6, 1/4, 1/4, \alpha_1\}$ |
| 25 | $\{6, 1/4, 1/4, \alpha_2\}$ |
| 26 | $\{6, 1/4, 1/2, \alpha_1\}$ |
| 27 | $\{6, 1/4, 1/2, \alpha_2\}$ |
| 28 | $\{6, 1/4, 3/4, \alpha_1\}$ |
| 29 | $\{6, 1/4, 3/4, \alpha_2\}$ |
| 30 | $\{6, 1/2, 1/4, \alpha_1\}$ |
| 31 | $\{6, 1/2, 1/4, \alpha_2\}$ |

Implementation Mode 2-3

The configuration of {number L of first basis vectors, parameter p, feedback proportion β of the weighting coefficients, scale factor α} is determined according to the number of ports for the reference signal and the index value.

In a specific embodiment, as shown in Tables 14 and 15, the number of ports for the reference signal in Table 14 is less than 32, and the number of ports for the reference signal in Table 15 is greater than or equal to 32. Which table is used may be determined according to the number of ports for the reference signal, and then the configuration of $\{L, v_0, \beta, \alpha\}$ or $\{L, (v_0, y_0), \beta, \alpha\}$ may be determined according to the index value. $\alpha_1 < \alpha_2$, and $$\alpha_1, \alpha_2 \in \left\{\frac{3}{2}, 2, \frac{5}{2}, 3\right\}.$$

In addition, when the number $N_3$ of precoding sub-bands is less than 19, the index value may only be configured as even or odd, and the value of the scale factor $\alpha$ is invalid by default. When the number $N_3$ of precoding sub-bands is greater than or equal to 19, the value of the scale factor $\alpha$ is valid.

TABLE 14

| Index value | $\{L, v_0, \beta\ \alpha\}$ |
|---|---|
| 0 | $\{2, ¼, ¼, \alpha_1\}$ |
| 1 | $\{2, ¼, ¼, \alpha_2\}$ |
| 2 | $\{2, ¼, ½, \alpha_1\}$ |
| 3 | $\{2, ¼, ½, \alpha_2\}$ |
| 4 | $\{2, ¼, ¾, \alpha_1\}$ |
| 5 | $\{2, ¼, ¾, \alpha_2\}$ |
| 6 | $\{2, ½, ¼, \alpha_1\}$ |
| 7 | $\{2, ½, ¼, \alpha_2\}$ |
| 8 | $\{2, ½, ½, \alpha_1\}$ |
| 9 | $\{2, ½, ½, \alpha_2\}$ |
| 10 | $\{2, ½, ¾, \alpha_1\}$ |
| 11 | $\{2, ½, ¾, \alpha_2\}$ |
| 12 | $\{4, ¼, ¼, \alpha_1\}$ |
| 13 | $\{4, ¼, ¼, \alpha_2\}$ |
| 14 | $\{4, ¼, ½, \alpha_1\}$ |
| 15 | $\{4, ¼, ½, \alpha_2\}$ |
| 16 | $\{4, ¼, ¾, \alpha_1\}$ |
| 17 | $\{4, ¼, ¾, \alpha_2\}$ |
| 18 | $\{4, ½, ¼, \alpha_1\}$ |
| 19 | $\{4, ½, ¼, \alpha_2\}$ |
| 20 | $\{4, ½, ½, \alpha_1\}$ |
| 21 | $\{4, ½, ½, \alpha_2\}$ |
| 22 | $\{4, ½, ¾, \alpha_1\}$ |
| 23 | $\{4, ½, ¾, \alpha_2\}$ |

TABLE 15

| Index value | $\{L, v_0, \beta\ \alpha\}$ |
|---|---|
| 0 | $\{2, ¼, ¼, \alpha_1\}$ |
| 1 | $\{2, ¼, ¼, \alpha_2\}$ |
| 2 | $\{2, ¼, ½, \alpha_1\}$ |
| 3 | $\{2, ¼, ½, \alpha_2\}$ |
| 4 | $\{2, ¼, ¾, \alpha_1\}$ |
| 5 | $\{2, ¼, ¾, \alpha_2\}$ |
| 6 | $\{2, ½, ¼, \alpha_1\}$ |
| 7 | $\{2, ½, ¼, \alpha_2\}$ |
| 8 | $\{2, ½, ½, \alpha_1\}$ |
| 9 | $\{2, ½, ½, \alpha_2\}$ |
| 10 | $\{2, ½, ¾, \alpha_1\}$ |
| 11 | $\{2, ½, ¾, \alpha_2\}$ |
| 12 | $\{4, ¼, ¼, \alpha_1\}$ |
| 13 | $\{4, ¼, ¼, \alpha_2\}$ |
| 14 | $\{4, ¼, ½, \alpha_1\}$ |
| 15 | $\{4, ¼, ½, \alpha_2\}$ |
| 16 | $\{4, ¼, ¾, \alpha_1\}$ |
| 17 | $\{4, ¼, ¾, \alpha_2\}$ |
| 18 | $\{4, ½, ¼, \alpha_1\}$ |
| 19 | $\{4, ½, ¼, \alpha_2\}$ |
| 20 | $\{4, ½, ½, \alpha_1\}$ |
| 21 | $\{4, ½, ½, \alpha_2\}$ |
| 22 | $\{4, ½, ¾, \alpha_1\}$ |
| 23 | $\{4, ½, ¾, \alpha_2\}$ |
| 24 | $\{6, ¼, ¼, \alpha_1\}$ |
| 25 | $\{6, ¼, ¼, \alpha_2\}$ |
| 26 | $\{6, ¼, ½, \alpha_1\}$ |
| 27 | $\{6, ¼, ½, \alpha_2\}$ |
| 28 | $\{6, ¼, ¾, \alpha_1\}$ |
| 29 | $\{6, ¼, ¾, \alpha_2\}$ |
| 30 | $\{6, ½, ¼, \alpha_1\}$ |
| 31 | $\{6, ½, ¼, \alpha_2\}$ |

Implementation Mode 2-4

The configuration of {number L of first basis vectors, parameter p, feedback proportion $\beta$ of the weighting coefficients} is determined according to the maximum rank that can be fed back and the index value. In a specific embodiment, as shown in Tables 16 and 17, the maximum rank that can be fed back in Table 16 is 2, and the maximum rank that can be fed back in Table 17 is 4. Which one of Table 16 and Table 17 is used may be determined according to the magnitude of the maximum rank that can be fed back, and then the configuration of $\{L, v_0, \beta\}$ or $\{L, (v_0, y_0), \beta\}$ may be determined according to the index value.

TABLE 16

| Index value | $\{L, v_0, \beta\}$ |
|---|---|
| 0 | $\{2, ¼, ¼\}$ |
| 1 | $\{2, ¼, ½\}$ |
| 2 | $\{2, ¼, ¾\}$ |
| 3 | $\{2, ½, ¼\}$ |
| 4 | $\{2, ½, ½\}$ |
| 5 | $\{2, ½, ¾\}$ |
| 6 | $\{4, ¼, ¼\}$ |
| 7 | $\{4, ¼, ½\}$ |
| 8 | $\{4, ¼, ¾\}$ |
| 9 | $\{4, ½, ¼\}$ |
| 10 | $\{4, ½, ½\}$ |
| 11 | $\{4, ½, ¾\}$ |
| 12 | $\{6, ¼, ¼\}$ |
| 13 | $\{6, ¼, ½\}$ |
| 14 | $\{6, ¼, ¾\}$ |
| 15 | $\{6, ½, ¼\}$ |

TABLE 17

| Index value | $\{L, (v_0, y_0), \beta\}$ |
|---|---|
| 0 | $\{2, (¼, ⅛), ¼\}$ |
| 1 | $\{2, (¼, ⅛), ½\}$ |
| 2 | $\{2, (¼, ⅛), ¾\}$ |
| 3 | $\{2, (¼, ¼), ¼\}$ |
| 4 | $\{2, (¼, ¼), ½\}$ |
| 5 | $\{2, (¼, ¼), ¾\}$ |
| 6 | $\{2, (½, ½), ¼\}$ |
| 7 | $\{2, (½, ½), ½\}$ |
| 8 | $\{2, (½, ½), ¾\}$ |
| 9 | $\{4, (¼, ⅛), ¼\}$ |
| 10 | $\{4, (¼, ⅛), ½\}$ |
| 11 | $\{4, (¼, ⅛), ¾\}$ |
| 12 | $\{4, (¼, ¼), ¼\}$ |
| 13 | $\{4, (¼, ¼), ½\}$ |
| 14 | $\{4, (¼, ¼), ¾\}$ |
| 15 | $\{6, (¼, 0), ¼\}$ |
| 16 | $\{6, (¼, 0), ½\}$ |
| 17 | $\{6, (¼, 0), ¾\}$ |
| 18 | $\{6, (½, 0), ¼\}$ |

Implementation Mode 2-5

The configuration of {number L of first basis vectors, parameter p, feedback proportion $\beta$ of the weighting coefficients, parameter $\alpha$} is determined according to the maximum rank that can be fed back, the number of precoding sub-bands, and the index value.

In a specific embodiment, as shown in Tables 18, 19, 20, and 21, the maximum rank that can be fed back in Table 18 is 2 and $N_3 \leq 19$, the maximum rank that can be fed back in Table 19 is 2 and $N_3 > 19$, the maximum rank that can be fed back in Table 20 is 4 and $N_3 \leq 19$, and the maximum rank that can be fed back in Table 21 is 4 and $N_3 > 19$. Which table is used may be determined according to the magnitude of the maximum rank that can be fed back and the number of precoding sub-bands, and then the configuration of $\{L, v_0, \beta\}$ or $\{L, v_0, \beta, \alpha\}$ or $\{L, (v_0, y_0), \beta\}$ or $\{L, (v_0, y_0), \beta, \alpha\}$ may be determined according to the index value. $\alpha_1 < \alpha_2$, and $$\alpha_1, \alpha_2 \in \left\{\frac{3}{2}, 2, \frac{5}{2}, 3\right\}.$$

TABLE 18

| Index value | $\{L, v_0, \beta\}$ |
|---|---|
| 0 | $\{2, ¼, ¼\}$ |
| 1 | $\{2, ¼, ½\}$ |
| 2 | $\{2, ¼, ¾\}$ |
| 3 | $\{2, ½, ¼\}$ |
| 4 | $\{2, ½, ½\}$ |
| 5 | $\{2, ½, ¾\}$ |
| 6 | $\{4, ¼, ¼\}$ |
| 7 | $\{4, ¼, ½\}$ |
| 8 | $\{4, ¼, ¾\}$ |
| 9 | $\{4, ½, ¼\}$ |
| 10 | $\{4, ½, ½\}$ |
| 11 | $\{4, ½, ¾\}$ |
| 12 | $\{6, ¼, ¼\}$ |
| 13 | $\{6, ¼, ½\}$ |
| 14 | $\{6, ¼, ¾\}$ |
| 15 | $\{6, ½, ¼\}$ |

TABLE 19

| Index value | $\{L, v_0, \beta, \alpha\}$ |
|---|---|
| 0 | $\{2, ¼, ¼, \alpha_1\}$ |
| 1 | $\{2, ¼, ¼, \alpha_2\}$ |
| 2 | $\{2, ¼, ½, \alpha_1\}$ |
| 3 | $\{2, ¼, ½, \alpha_2\}$ |
| 4 | $\{2, ¼, ¾, \alpha_1\}$ |
| 5 | $\{2, ¼, ¾, \alpha_2\}$ |
| 6 | $\{2, ½, ¼, \alpha_1\}$ |
| 7 | $\{2, ½, ¼, \alpha_2\}$ |
| 8 | $\{2, ½, ½, \alpha_1\}$ |
| 9 | $\{2, ½, ½, \alpha_2\}$ |
| 10 | $\{2, ½, ¾, \alpha_1\}$ |
| 11 | $\{2, ½, ¾, \alpha_2\}$ |
| 12 | $\{4, ¼, ¼, \alpha_1\}$ |
| 13 | $\{4, ¼, ¼, \alpha_2\}$ |
| 14 | $\{4, ¼, ½, \alpha_1\}$ |
| 15 | $\{4, ¼, ½, \alpha_2\}$ |
| 16 | $\{4, ¼, ¾, \alpha_1\}$ |
| 17 | $\{4, ¼, ¾, \alpha_2\}$ |
| 18 | $\{4, ½, ¼, \alpha_1\}$ |
| 19 | $\{4, ½, ¼, \alpha_2\}$ |
| 20 | $\{4, ½, ½, \alpha_1\}$ |
| 21 | $\{4, ½, ½, \alpha_2\}$ |
| 22 | $\{4, ½, ¾, \alpha_1\}$ |
| 23 | $\{4, ½, ¾, \alpha_2\}$ |
| 24 | $\{6, ¼, ¼, \alpha_1\}$ |
| 25 | $\{6, ¼, ¼, \alpha_2\}$ |
| 26 | $\{6, ¼, ½, \alpha_1\}$ |
| 27 | $\{6, ¼, ½, \alpha_2\}$ |
| 28 | $\{6, ¼, ¾, \alpha_1\}$ |

TABLE 19-continued

| Index value | $\{L, v_0, \beta, \alpha\}$ |
|---|---|
| 29 | $\{6, ¼, ¾, \alpha_2\}$ |
| 30 | $\{6, ½, ¼, \alpha_1\}$ |
| 31 | $\{6, ½, ¼, \alpha_2\}$ |

TABLE 20

| Index value | $\{L, (v_0, y_0), \beta\}$ |
|---|---|
| 0 | $\{2, (¼, ⅛), ¼\}$ |
| 1 | $\{2, (¼, ⅛), ½\}$ |
| 2 | $\{2, (¼, ⅛), ¾\}$ |
| 3 | $\{2, (¼, ¼), ¼\}$ |
| 4 | $\{2, (¼, ¼), ½\}$ |
| 5 | $\{2, (¼, ¼), ¾\}$ |
| 6 | $\{2, (½, ½), ¼\}$ |
| 7 | $\{2, (½, ½), ½\}$ |
| 8 | $\{2, (½, ½), ¾\}$ |
| 9 | $\{4, (¼, ⅛), ¼\}$ |
| 10 | $\{4, (¼, ⅛), ½\}$ |
| 11 | $\{4, (¼, ⅛), ¾\}$ |
| 12 | $\{4, (¼, ¼), ¼\}$ |
| 13 | $\{4, (¼, ¼), ½\}$ |
| 14 | $\{4, (¼, ¼), ¾\}$ |
| 15 | $\{6, (¼, 0), ¼\}$ |
| 16 | $\{6, (¼, 0), ½\}$ |
| 17 | $\{6, (¼, 0), ¾\}$ |
| 18 | $\{6, (½, 0), ¼\}$ |

TABLE 21

| Index value | $\{L, (v_0, y_0), \beta, \alpha\}$ |
|---|---|
| 0 | $\{2, (¼, ⅛), ¼, \alpha_1\}$ |
| 1 | $\{2, (¼, ⅛), ¼, \alpha_2\}$ |
| 2 | $\{2, (¼, ⅛), ½, \alpha_1\}$ |
| 3 | $\{2, (¼, ⅛), ½, \alpha_2\}$ |
| 4 | $\{2, (¼, ⅛), ¾, \alpha_1\}$ |
| 5 | $\{2, (¼, ⅛), ¾, \alpha_2\}$ |
| 6 | $\{2, (¼, ¼), ¼, \alpha_1\}$ |
| 7 | $\{2, (¼, ¼), ¼, \alpha_2\}$ |
| 8 | $\{2, (¼, ¼), ½, \alpha_1\}$ |
| 9 | $\{2, (¼, ¼), ¾, \alpha_1\}$ |
| 10 | $\{2, (¼, ¼), ¾, \alpha_2\}$ |
| 11 | $\{2, (½, ½), ¼, \alpha_1\}$ |
| 12 | $\{2, (½, ½), ¼, \alpha_2\}$ |
| 13 | $\{2, (½, ½), ½, \alpha_1\}$ |
| 14 | $\{2, (½, ½), ½, \alpha_2\}$ |
| 15 | $\{2, (½, ½), ¾, \alpha_1\}$ |
| 16 | $\{2, (½, ½), ¾, \alpha_2\}$ |
| 17 | $\{4, (¼, ⅛), ¼, \alpha_1\}$ |
| 18 | $\{4, (¼, ⅛), ¼, \alpha_2\}$ |
| 19 | $\{4, (¼, ⅛), ½, \alpha_1\}$ |
| 20 | $\{4, (¼, ⅛), ½, \alpha_2\}$ |
| 21 | $\{4, (¼, ⅛), ¾, \alpha_1\}$ |
| 22 | $\{4, (¼, ⅛), ¾, \alpha_2\}$ |
| 23 | $\{4, (¼, ¼), ¼, \alpha_1\}$ |
| 24 | $\{4, (¼, ¼), ¼, \alpha_2\}$ |
| 25 | $\{4, (¼, ¼), ½, \alpha_1\}$ |
| 26 | $\{4, (¼, ¼), ½, \alpha_2\}$ |
| 27 | $\{4, (¼, ¼), ¾, \alpha_1\}$ |
| 28 | $\{4, (¼, ¼), ¾, \alpha_2\}$ |
| 29 | $\{6, (¼, 0), ¼, \alpha_1\}$ |
| 30 | $\{6, (¼, 0), ¼, \alpha_2\}$ |
| 31 | $\{6, (¼, 0), ½, \alpha_1\}$ |
| 32 | $\{6, (¼, 0), ½, \alpha_2\}$ |
| 33 | $\{6, (¼, 0), ¾, \alpha_1\}$ |
| 34 | $\{6, (¼, 0), ¾, \alpha_2\}$ |
| 35 | $\{6, (½, 0), ¼, \alpha_1\}$ |
| 36 | $\{6, (½, 0), ¼, \alpha_2\}$ |

Implementation Mode 2-6

The configuration of {number L of first basis vectors, parameter p, feedback proportion β of the weighting coefficients, parameter α} is determined according to the magnitude of the maximum rank that can be fed back and the index value.

In a specific embodiment, as shown in Tables 22 and 23, the maximum rank that can be fed back in Table 22 is 2, and the maximum rank that can be fed back in Table 23 is 4. Which table is used may be determined according to the magnitude of the maximum rank that can be fed back and the number of precoding sub-bands, and then the configuration of {L, $v_0$, β, α} or {L, ($v_0$, $y_0$), β, α} may be determined according to the index value. $\alpha_1 < \alpha_2$, and $$a_1, a_2 \in \left\{\frac{3}{2}, 2, \frac{5}{2}, 3\right\}.$$

In addition, when the number $N_3$ of precoding sub-bands is less than 19, the index value may only be configured as even or odd, and the value of the scale factor α is invalid by default. When the number $N_3$ of precoding sub-bands is greater than or equal to 19, the value of the scale factor α is valid.

TABLE 22

| Index value | {L, $v_0$, β, α} |
|---|---|
| 0 | {2, ¼, ¼, $\alpha_1$} |
| 1 | {2, ¼, ¼, $\alpha_2$} |
| 2 | {2, ¼, ½, $\alpha_1$} |
| 3 | {2, ¼, ½, $\alpha_2$} |
| 4 | {2, ¼, ¾, $\alpha_1$} |
| 5 | {2, ¼, ¾, $\alpha_2$} |
| 6 | {2, ½, ¼, $\alpha_1$} |
| 7 | {2, ½, ¼, $\alpha_2$} |
| 8 | {2, ½, ½, $\alpha_1$} |
| 9 | {2, ½, ½, $\alpha_2$} |
| 10 | {2, ½, ¾, $\alpha_1$} |
| 11 | {2, ½, ¾, $\alpha_2$} |
| 12 | {4, ¼, ¼, $\alpha_1$} |
| 13 | {4, ¼, ¼, $\alpha_2$} |
| 14 | {4, ¼, ½, $\alpha_1$} |
| 15 | {4, ¼, ½, $\alpha_2$} |
| 16 | {4, ¼, ¾, $\alpha_1$} |
| 17 | {4, ¼, ¾, $\alpha_2$} |
| 18 | {4, ½, ¼, $\alpha_1$} |
| 19 | {4, ½, ¼, $\alpha_2$} |
| 20 | {4, ½, ½, $\alpha_1$} |
| 21 | {4, ½, ½, $\alpha_2$} |
| 22 | {4, ½, ¾, $\alpha_1$} |
| 23 | {4, ½, ¾, $\alpha_2$} |
| 24 | {6, ¼, ¼, $\alpha_1$} |
| 25 | {6, ¼, ¼, $\alpha_2$} |
| 26 | {6, ¼, ½, $\alpha_1$} |
| 27 | {6, ¼, ½, $\alpha_2$} |
| 28 | {6, ¼, ¾, $\alpha_1$} |
| 29 | {6, ¼, ¾, $\alpha_2$} |
| 30 | {6, ½, ¼, $\alpha_1$} |
| 31 | {6, ½, ¼, $\alpha_2$} |

TABLE 23

| Index value | {L, ($v_0$, $y_0$), β, α} |
|---|---|
| 0 | {2, (¼, ⅛), ¼, $\alpha_1$} |
| 1 | {2, (¼, ⅛), ¼, $\alpha_2$} |
| 2 | {2, (¼, ⅛), ½, $\alpha_1$} |
| 3 | {2, (¼, ⅛), ½, $\alpha_2$} |
| 4 | {2, (¼, ⅛), ¾, $\alpha_1$} |
| 5 | {2, (¼, ⅛), ¾, $\alpha_2$} |
| 6 | {2, (¼, ¼), ¼, $\alpha_1$} |
| 7 | {2, (¼, ¼), ¼, $\alpha_2$} |
| 8 | {2, (¼, ¼), ½, $\alpha_1$} |
| 9 | {2, (¼, ¼), ½, $\alpha_2$} |
| 10 | {2, (¼, ¼), ¾, $\alpha_2$} |
| 11 | {2, (½, ½), ¼, $\alpha_1$} |
| 12 | {2, (½, ½), ¼, $\alpha_2$} |
| 13 | {2, (½, ½), ½, $\alpha_1$} |
| 14 | {2, (½, ½), ½, $\alpha_2$} |
| 15 | {2, (½, ½), ¾, $\alpha_1$} |
| 16 | {2, (½, ½), ¾, $\alpha_2$} |
| 17 | {4, (¼, ⅛), ¼, $\alpha_1$} |
| 18 | {4, (¼, ⅛), ¼, $\alpha_2$} |
| 19 | {4, (¼, ⅛), ½, $\alpha_1$} |
| 20 | {4, (¼, ⅛), ½, $\alpha_2$} |
| 21 | {4, (¼, ⅛), ¾, $\alpha_1$} |
| 22 | {4, (¼, ⅛), ¾, $\alpha_2$} |
| 23 | {4, (¼, ¼), ¼, $\alpha_1$} |
| 24 | {4, (¼, ¼), ¼, $\alpha_2$} |
| 25 | {4, (¼, ¼), ½, $\alpha_1$} |
| 26 | {4, (¼, ¼), ½, $\alpha_2$} |
| 27 | {4, (¼, ¼), ¾, $\alpha_1$} |
| 28 | {4, (¼, ¼), ¾, $\alpha_2$} |
| 29 | {6, (¼, 0), ¼, $\alpha_1$} |
| 30 | {6, (¼, 0), ¼, $\alpha_2$} |
| 31 | {6, (¼, 0), ½, $\alpha_1$} |
| 32 | {6, (¼, 0), ½, $\alpha_2$} |
| 33 | {6, (¼, 0), ¾, $\alpha_1$} |
| 34 | {6, (¼, 0), ¾, $\alpha_2$} |
| 35 | {6, (½, 0), ¼, $\alpha_1$} |
| 36 | {6, (½, 0), ¼, $\alpha_2$} |

3. Ordering Mode of Bitmap Information, Amplitude Information of Weighting Coefficients, and Phase Information of Weighting Coefficients In the following embodiments of the present disclosure, the terminal and the base station agree to feed back bitmap information, amplitude information of weighting coefficients, and phase information of weighting coefficients by using one of the following implementation modes.

Implementation Mode 3-1

The bitmap information, the amplitude information of the weighting coefficients, and the phase information of the weighting coefficients each are ordered according to an order of priorities of a layer index, an index of a first basis vector, and an index of a second basis vector from high to low. The priority of the layer index refers to that the weighting coefficient with the lowest layer index has the highest priority. The index of the first basis vector corresponds to a row index of the matrix $\tilde{W}_2$, and the weighting coefficient with the lowest row index has the highest priority. The index of the second basis vector corresponds to a column index of the matrix $\tilde{W}_2$, and the weighting coefficient with the lowest column index has the highest priority.

Implementation Mode 3-2

The bitmap information, the amplitude information of the weighting coefficients, and the phase information of the weighting coefficients each are ordered according to an order of priorities of a layer index, an index of a second basis vector, and an index of a first basis vector from high to low. The priority of the layer index refers to that the weighting coefficient with the lowest layer index has the highest priority. The index of the second basis vector corresponds to a column index of the matrix $\tilde{W}_2$, and the weighting coefficient with the lowest column index has the highest priority. The index of the first basis vector corresponds to a row index of the matrix $\tilde{W}_2$, and the weighting coefficient with the lowest row index has the highest priority.

Implementation Mode 3-3

The bitmap information, the amplitude information of the weighting coefficients, and the phase information of the weighting coefficients each are ordered according to an order of priorities of an index of a first basis vector, an index of a second basis vector, and a layer index from high to low. The index of the first basis vector corresponds to a row index of the matrix $\tilde{W}_2$, and the weighting coefficient with the lowest row index has the highest priority. The index of the second basis vector corresponds to a column index of the matrix $\tilde{W}_2$, and the weighting coefficient with the lowest column index has the highest priority. The priority of the layer index refers to that the weighting coefficient with the lowest layer index has the highest priority.

Implementation Mode 3-4

The bitmap information, the amplitude information of the weighting coefficients, and the phase information of the weighting coefficients each are ordered according to an order of priorities of an index of a second basis vector, an index of a first basis vector, and a layer index from high to low. The index of the second basis vector corresponds to a column index of the matrix $\tilde{W}^2$, and the weighting coefficient with the lowest column index has the highest priority. The index of the first basis vector corresponds to a row index of the matrix $\tilde{W}_2$, and the weighting coefficient with the lowest row index has the highest priority. The priority of the layer index refers to that the weighting coefficient with the lowest layer index has the highest priority.

Implementation Mode 3-5

The bitmap information, the amplitude information of the weighting coefficients, and the phase information of the weighting coefficients each are ordered according to an order of priorities of an index of a first basis vector, an index of a second basis vector, an antenna port group index, and a layer index from high to low. The index of the first basis vector corresponds to a row index of the matrix $\tilde{W}_2$, and the weighting coefficient with the lowest row index has the highest priority. The index of the second basis vector corresponds to a column index of the matrix $\tilde{W}_2$, and the weighting coefficient with the lowest column index has the highest priority. For the priority of the antenna port group index, the priority of the weighting coefficient in the strong polarization direction is higher than the priority of the weighting coefficient in the weak polarization direction. The priority of the layer index refers to that the weighting coefficient with the lowest layer index has the highest priority.

Implementation Mode 3-6

The bitmap information, the amplitude information of the weighting coefficients, and the phase information of the weighting coefficients each are ordered according to an order of priorities of an index of a second basis vector, an index of a first basis vector, an antenna port group index, and a layer index from high to low. The index of the second basis vector corresponds to a column index of the matrix $\tilde{W}_2$, and the weighting coefficient with the lowest column index has the highest priority. The index of the first basis vector corresponds to a row index of the matrix $\tilde{W}_2$, and the weighting coefficient with the lowest row index has the highest priority. For the priority of the antenna port group index, the priority of the weighting coefficient in the strong polarization direction is higher than the priority of the weighting coefficient in the weak polarization direction. The priority of the layer index refers to that the weighting coefficient with the lowest layer index has the highest priority.

Implementation Mode 3-7

The bitmap information, the amplitude information of the weighting coefficients, and the phase information of the weighting coefficients each are ordered according to an order of priorities of an antenna port group index, an index of a first basis vector, an index of a second basis vector, and a layer index from high to low. For the priority of the antenna port group index, the priority of the weighting coefficient in the strong polarization direction is higher than the priority of the weighting coefficient in the weak polarization direction. The index of the first basis vector corresponds to a row index of the matrix $\tilde{W}_2$, and the weighting coefficient with the lowest row index has the highest priority. The index of the second basis vector corresponds to a column index of the matrix $\tilde{W}_2$, and the weighting coefficient with the lowest column index has the highest priority. The priority of the layer index refers to that the weighting coefficient with the lowest layer index has the highest priority.

Implementation Mode 3-8

The bitmap information, the amplitude information of the weighting coefficients, and the phase information of the weighting coefficients each are ordered according to an order of priorities of an antenna port group index, an index of a second basis vector, an index of a first basis vector, and a layer index from high to low. For the priority of the antenna port group index, the priority of the weighting coefficient in the strong polarization direction is higher than the priority of the weighting coefficient in the weak polarization direction. The index of the second basis vector corresponds to a column index of the matrix $\tilde{W}_2$, and the weighting coefficient with the lowest column index has the highest priority. The index of the first basis vector corresponds to a row index of the matrix $\tilde{W}_2$, and the weighting coefficient with the lowest row index has the highest priority. The priority of the layer index refers to that the weighting coefficient with the lowest layer index has the highest priority.

4. Mode of Discarding Partial Precoding Information

One channel state information report consists of two parts, and the size of a resource occupied by the first part of channel state information is fixed, and the first part of channel state information is used for indicating the size of a resource occupied by the second part of channel state information. The first part of channel state information includes, but is not limited to, rank indication information or the total number of weighting coefficients at all layers in the second part of channel state information. The second part of channel state information includes, but is not limited to, a selection indication of a first basis vector, a selection indication of a second basis vector at each layer, or weighting coefficient information of each layer. Since the base station cannot know the rank actually fed back by the terminal, the resources allocated by the base station and used for feeding back the CSI may be insufficient, and thus the terminal needs to discard partial precoding information according to a priority order. Specifically, the principle of discarding may be selected from one of the following two implementation modes.

Implementation Mode 4-1

Implementation sub-mode 4-1-1: Amplitude information of part of the weighting coefficients having the lowest priority and phase information of the part of the weighting coefficients having the lowest priority are discarded.

According to the above criteria, the discarding is performed until the resources for transmitting first-type signaling are sufficient to transmit the actual channel state information. Meanwhile, the total number of weighting coefficients at all layers is recalculated, and the total number of weighting coefficients at all layers in the first part of the channel state information is updated.

Implementation sub-mode 4-1-2: Amplitude information of part of the weighting coefficients having the lowest priority and phase information of the part of the weighting coefficients having the lowest priority are discarded. According to the above criteria, the discarding is performed until the resources for transmitting the first-type signaling are sufficient to transmit the actual channel state information. Meanwhile, the total number of weighting coefficients at all layers in the first part of the channel state information is not updated, and feedback is performed still according to the total number of weighting coefficients at all layers before the discarding. In this way, the base station can implicitly know the number of weighting coefficients discarded by the terminal, which facilitates the scheduling of the base station.

Implementation Mode 4-2

Figure 5:
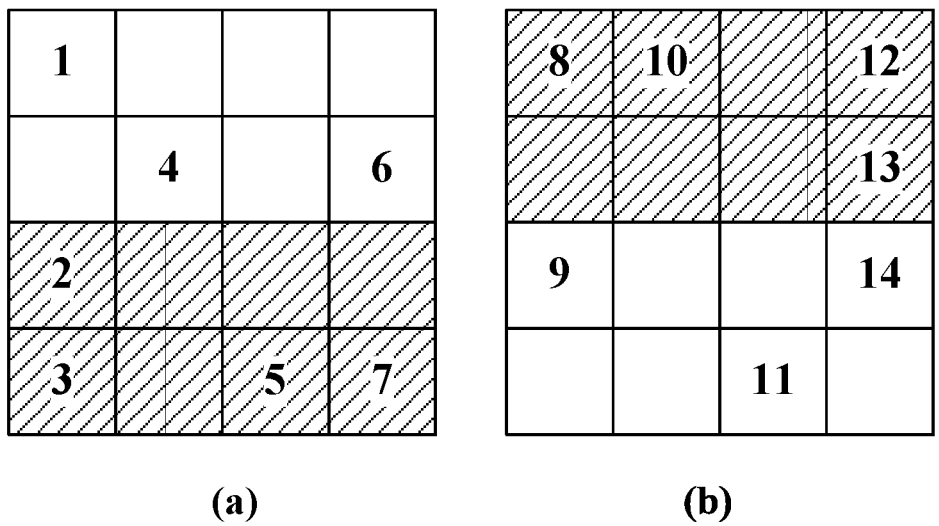
FIGS. 5 (A) and (B) are a schematic diagram of weighting coefficients at Layer 0 and Layer 1 which are fed back according to an embodiment of the present disclosure.

Implementation sub-mode 4-2-1: Amplitude information of part of the weighting coefficients having the lowest priority and phase information of the part of the weighting coefficients having the lowest priority are discarded. Meanwhile, part of bitmap information having the lowest priority is discarded, and the part of the bitmap information having the lowest priority refers to part of bitmap information corresponding to the weighting coefficient having the lowest priority. According to the above criteria, the discarding is performed until the resources for transmitting the first-type signaling are sufficient to transmit the actual channel state Assuming L=2, M=4, RI=2 and $$\beta = \frac{1}{2},$$

the weighting coefficients to be fed back are the weighting coefficients marked with serial numbers shown in FIGS. 5 (A) and (B), where FIGS. 5 (A) and (B) represent Layer 0 and Layer 1, respectively, and the weighting coefficients marked 2 and 8 in the figures are the index positions of the weighting coefficient reference amplitudes of Layer 0 and Layer 1, respectively. The shaded part indicates the strong polarization direction of each layer.

The bitmap information, the amplitude information of the weighting coefficients, and the phase information of the weighting coefficients are fed back by using the mode in Implementation mode 3-4. If the index position of the weighting coefficient reference amplitude of each layer requires the feedback of the bitmap information, the bitmap information is 11001110 01100000 00000011 01110110. If the index position of the weighting coefficient reference amplitude of each layer does not require the feedback of the bitmap information, the bitmap information is 100110 01100000 00000011 01110110. The amplitude information of the weighting coefficients and the phase information of the weighting coefficients are shown in Table 24, where the amplitude and phase information of the weighting coefficient indicated by the index position of the weighting coefficient reference amplitude of each layer do not need to be fed back.

TABLE 24

| Amplitude and phase of the weighting coefficient marked 1 | Amplitude and phase of the weighting coefficient marked 9 | Amplitude and phase of the weighting coefficient marked 3 | Amplitude and phase of the weighting coefficient marked 10 | Amplitude and phase of the weighting coefficient marked 4 | Amplitude and phase of the weighting coefficient marked 5 | Amplitude and phase of the weighting coefficient marked 11 | Amplitude and phase of the weighting coefficient marked 12 | Amplitude and phase of the weighting coefficient marked 6 | Amplitude and phase of the weighting coefficient marked 13 | Amplitude and phase of the weighting coefficient marked 14 | Amplitude and phase of the weighting coefficient marked 7 |
| --- | --- | --- | --- | --- | --- | --- | --- | --- | --- | --- | --- | information. Meanwhile, the total number of weighting coefficients at all layers is recalculated, and the total number of weighting coefficients at all layers in the first part of the channel state information is updated.

Implementation sub-mode 4-2-2: Amplitude information of part of the weighting coefficients having the lowest priority and phase information of the part of the weighting coefficients having the lowest priority are discarded. Meanwhile, part of bitmap information having the lowest priority is discarded, and the part of the bitmap information having the lowest priority refers to part of bitmap information corresponding to the weighting coefficients having the lowest priority. Meanwhile, the total number of weighting coefficients at all layers in the first part of the channel state information is not updated, and feedback is performed still according to the total number of weighting coefficients at all layers before the discarding. In this way, the base station can implicitly know the number of weighting coefficients discarded by the terminal, which facilitates the scheduling of the base station.

Assuming that the feedback resources are insufficient, three weighting coefficients need to be discarded. If the mode in Implementation mode 4-2-1 is adopted, the weighting coefficients marked 7, 14, and 13 are discarded. If the index position of the weighting coefficient reference amplitude of each layer requires the feedback of the bitmap information, the bitmap information after the discarding is 11001110 01100000 00000011 01100. If the index position of the weighting coefficient reference amplitude of each layer does not require the feedback of the bitmap information, the bitmap information after the discarding is 100110 01100000 00000011 01100. The amplitude information of the weighting coefficients and the phase information of the weighting coefficients are shown in Table 25, where the amplitude and phase information of the weighting coefficient indicated by the index position of the weighting coefficient reference amplitude of each layer do not need to be fed back.

TABLE 25

| Amplitude and phase of the weighting coefficient marked 1 | Amplitude and phase of the weighting coefficient marked 9 | Amplitude and phase of the weighting coefficient marked 3 | Amplitude and phase of the weighting coefficient marked 10 | Amplitude and phase of the weighting coefficient marked 4 | Amplitude and phase of the weighting coefficient marked 5 | Amplitude and phase of the weighting coefficient marked 11 | Amplitude and phase of the weighting coefficient marked 12 | Amplitude and phase of the weighting coefficient marked 6 |
|---|---|---|---|---|---|---|---|---|

The bitmap information, the amplitude information of the weighting coefficients, and the phase information of the weighting coefficients are fed back by using the mode in Implementation mode 3-6. If the index position of the weighting coefficient reference amplitude of each layer requires the feedback of the bitmap information, the bitmap information is 11100100 00100111 11000010 00010110. If the index position of the weighting coefficient reference amplitude of each layer does not require the feedback of the bitmap information, the bitmap information is 100100 00100111 11000010 00010110. The amplitude information of the weighting coefficients and the phase information of the weighting coefficients are shown in Table 26, where the amplitude and phase information of the weighting coefficient indicated by the index position of the weighting coefficient reference amplitude of each layer do not need to be fed back.

TABLE 26

| Amplitude and phase of the weighting coefficient marked 3 | Amplitude and phase of the weighting coefficient marked 10 | Amplitude and phase of the weighting coefficient marked 5 | Amplitude and phase of the weighting coefficient marked 12 | Amplitude and phase of the weighting coefficient marked 7 | Amplitude and phase of the weighting coefficient marked 13 | Amplitude and phase of the weighting coefficient marked 1 | Amplitude and phase of the weighting coefficient marked 9 | Amplitude and phase of the weighting coefficient marked 4 | Amplitude and phase of the weighting coefficient marked 11 | Amplitude and phase of the weighting coefficient marked 14 | Amplitude and phase of the weighting coefficient marked 6 |
|---|---|---|---|---|---|---|---|---|---|---|---|

Assuming that the feedback resources are insufficient, three weighting coefficients need to be discarded. If the mode in Implementation mode 4-2-1 is adopted, the weighting coefficients marked 6, 14, and 11 are discarded. If the index position of the weighting coefficient reference amplitude of each layer requires the feedback of the bitmap information, the bitmap information after the discarding is 11100100 00100111 11000010 00000. If the index position of the weighting coefficient reference amplitude of each layer does not require the feedback of the bitmap information, the bitmap information after the discarding is 100100 00100111 11000010 00000. The amplitude information of the weighting coefficients and the phase information of the weighting coefficients are shown in Table 27, where the amplitude and phase information of the weighting coefficient indicated by the index position of the weighting coefficient reference amplitude of each layer do not need to be fed back.

TABLE 27

| Amplitude and phase of the weighting coefficient marked 3 | Amplitude and phase of the weighting coefficient marked 10 | Amplitude and phase of the weighting coefficient marked 5 | Amplitude and phase of the weighting coefficient marked 12 | Amplitude and phase of the weighting coefficient marked 7 | Amplitude and phase of the weighting coefficient marked 13 | Amplitude and phase of the weighting coefficient marked 1 | Amplitude and phase of the weighting coefficient marked 9 | Amplitude and phase of the weighting coefficient marked 4 |
|---|---|---|---|---|---|---|---|---|

From the description of the preceding embodiments, it is apparent to those skilled in the art that the method in the preceding embodiments may be implemented by software plus a necessary general-purpose hardware platform or may of course be implemented by hardware. However, in many cases, the former is a preferred implementation. Based on this understanding, the solutions of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to perform the method described in each of the embodiments of the present disclosure.

The embodiment further provides a capability information feedback apparatus and a channel state information feedback apparatus. The apparatuses are used for implementing the above-mentioned embodiments and preferred embodiments. What has been described will not be repeated.

As used below, the terms "module" and "unit" may be software, hardware or a combination thereof capable of implementing predetermined functions. The apparatuses in the embodiments described below are preferably implemented by software, but an implementation by hardware or by a combination of software and hardware is also possible and conceivable.

Figure 6:
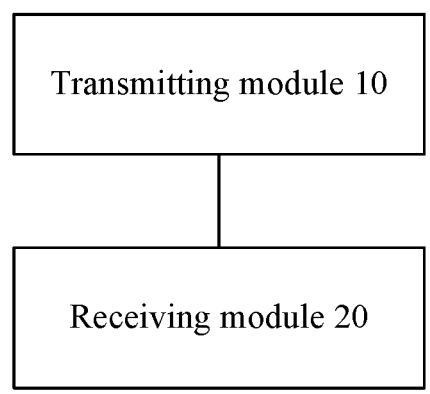
FIG. 6 is a structural diagram of a capability information feedback apparatus according to an embodiment of the present disclosure.

FIG. 6 is a structural diagram of a capability information feedback apparatus according to an embodiment of the present disclosure. The apparatus is located in the first communication node. The first communication node may be a mobile terminal, and the second communication node may be a base station. As shown in FIG. 6, the apparatus includes a transmitting module 10 and a receiving module 20.

The transmitting module 10 is configured to transmit capability information to a second communication node, where the capability information is used for indicating a capability of the first communication node. The receiving module 20 is configured to receive parameter signaling which is transmitted by the second communication node and corresponds to the capability of the first communication node.

Figure 7:
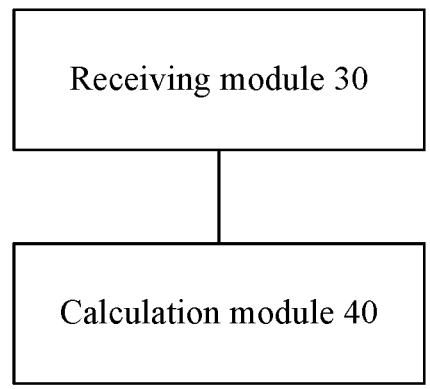
FIG. 7 is a structural diagram of a channel state information feedback apparatus according to an embodiment of the present disclosure.

FIG. 7 is a structural diagram of a channel state information feedback apparatus according to an embodiment of the present disclosure. The apparatus is located in the first communication node. The first communication node may be a mobile terminal, and the second communication node may be a base station. As shown in FIG. 7, the apparatus includes a calculation module 40. The calculation module 40 is configured to calculate channel state information and transmit first-type signaling to the second communication node; where a resource for transmitting the first-type signaling is less than a resource required for transmitting actual channel state information, and partial pre-coding information is discarded according to a priority order.

The apparatus may further include a receiving module 30. The receiving module 30 is configured to, before the transmitting module transmits the first-type signaling, receive parameter signaling of the second communication node, where the parameter signaling is used for indicating a parameter for calculating a channel state information report, a channel for transmitting the first-type signaling, and a size of a resource for transmitting the first-type signaling.

Figure 8:
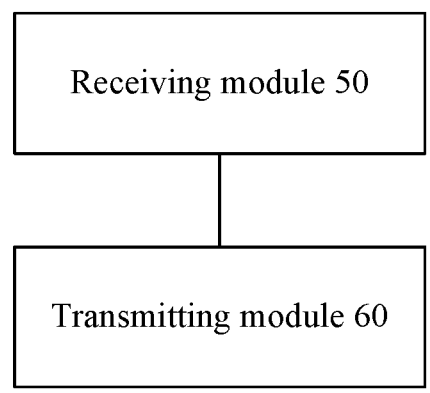
FIG. 8 is a structural diagram of a signaling parameter transmitting apparatus according to an embodiment of the present disclosure.

FIG. 8 is a structural diagram of a parameter signaling transmitting apparatus according to an embodiment of the present disclosure. The apparatus is located in the second communication node. The first communication node may be a mobile terminal, and the second communication node may be a base station. As shown in FIG. 8, the apparatus includes a receiving module 50 and a transmitting module 60.

The receiving module 50 is configured to receive capability information which is transmitted by a first communication node and used for indicating a capability of the first communication node. The transmitting module 60 is configured to transmit parameter signaling which corresponds to the capability of the first communication node to the first communication node.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

The embodiments of the present disclosure further provide a storage medium. The storage medium stores a computer program. When the computer program is executed, the steps in any one of the preceding method embodiments are performed.

Optionally, in this embodiment, the storage medium may include, but is not limited to, a universal serial bus (USB) flash drive, a read-only memory (ROM), a random access memory (RAM), a mobile hard disk, a magnetic disk, an optical disk or another medium capable of storing a computer program.

The embodiments of the present disclosure further provide an electronic apparatus which includes a memory and a processor. The memory has a computer program stored thereon, and the processor is configured to execute the computer program to perform the steps in any one of the preceding method embodiments.

Apparently, it should be understood by those skilled in the art that each of the preceding modules or steps of the present disclosure may be implemented by a general-purpose computing apparatus, the modules or steps may be concentrated on a single computing apparatus or distributed on a network composed of multiple computing apparatuses, and optionally, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this manner, the present disclosure is not limited to any specific combination of hardware and software.

The preceding are only preferred embodiments of the present disclosure and are not intended to limit the present disclosure. For those skilled in the art, the present disclosure may have various modifications and variations. Any modifications, equivalent substitutions, improvements and the like made in accordance with the principles of the present disclosure are within the scope of the present disclosure.

What is claimed is:

1. A channel state information feedback method, comprising:

calculating, by a first communication node, actual channel state information, and transmitting first-type signaling to a second communication node; wherein a resource for transmitting the first-type signaling is less than a resource required for transmitting the actual channel state information, and partial precoding information in the actual channel state information is discarded according to a priority order;

wherein precoding information comprises weighting coefficient information of each layer; characterized in that, the weighting coefficient information of each layer comprises: bitmap information, amplitude information of weighting coefficients, phase information of the weighting coefficients and an index position of a weighting coefficient reference amplitude, wherein the weighting coefficients are a weighting coefficient of a first basis vector and a weighting coefficient of a second basis vector; and amplitude information and phase information of a weighting coefficient indicated by the index position of the weighting coefficient reference amplitude of each layer do not to be fed back;

wherein the bitmap information, the amplitude information of the weighting coefficients, and the phase information of the weighting coefficients each are ordered according to an order of priorities of an index of the second basis vector, an index of the first basis vector, an antenna port group index and a layer index from high to low; wherein the index of the second basis vector corresponds to a column index of a matrix $\tilde{W}_2$, and a weighting coefficient with the lowest column index has the highest priority; the index of the first basis vector corresponds to a row index of the matrix $\tilde{W}_2$, and a weighting coefficient with the lowest row index has the highest priority; for a priority of the antenna port group index, a priority of the weighting coefficient in the strong polarization direction is higher than a priority of the weighting coefficient in the weak polarization direction; and the priority of the layer index refers to that a weighting coefficient with the lowest layer index has the highest priority; and wherein the partial precoding information is discarded according to the priority order comprises: amplitude information of part of the weighting coefficients having the lowest priority and phase information of the part of the weighting coefficients having the lowest priority are discarded.

2. The method of claim 1, before transmitting the first-type signaling to the second communication node, further comprising:
receiving, by the first communication node, parameter signaling of the second communication node, wherein the parameter signaling comprises configuration information for calculating a channel state information report, a channel for transmitting the first-type signaling, and a size of a resource of the channel for transmitting the first-type signaling.

3. The method of claim 2, wherein the first-type signaling comprises one or more channel state information reports; wherein the channel state information report comprises the precoding information.

4. The method of claim 3, wherein one channel state information report consists of two parts, comprising a first part of channel state information and a second part of channel state information; wherein a size of a resource occupied by the first part of channel state information is fixed, and the first part of channel state information is used for indicating a size of a resource occupied by the second part of channel state information.

5. The method of claim 4, wherein the first part of channel state information comprises: rank indication information and a total number of weighting coefficients at all layers in the second part of channel state information.

6. The method of claim 4, wherein the second part of channel state information comprises: a selection indication of the first basis vector, a selection indication of the second basis vector at each layer, or the weighting coefficient information of each layer.

7. A non-transitory storage medium, storing a computer program, wherein the computer program is configured to, when executed, perform the following steps:
calculating, by a first communication node, actual channel state information, and transmitting first-type signaling to a second communication node; wherein a resource for transmitting the first-type signaling is less than a resource required for transmitting the actual channel state information, and partial precoding information in the actual channel state information is discarded according to a priority order;
wherein precoding information comprises weighting coefficient information of each layer; characterized in that, the weighting coefficient information of each layer comprises: bitmap information, amplitude information of weighting coefficients, phase information of the weighting coefficients and an index position of a weighting coefficient reference amplitude, wherein the weighting coefficients are a weighting coefficient of a first basis vector and a weighting coefficient of a second basis vector; and amplitude information and phase information of a weighting coefficient indicated by the index position of the weighting coefficient reference amplitude of each layer do not to be fed back;
wherein the bitmap information, the amplitude information of the weighting coefficients, and the phase information of the weighting coefficients each are ordered according to an order of priorities of an index of the second basis vector, an index of the first basis vector, an antenna port group index and a layer index from high to low; wherein the index of the second basis vector corresponds to a column index of a matrix $\tilde{W}_2$, and a weighting coefficient with the lowest column index has the highest priority; the index of the first basis vector corresponds to a row index of the matrix $\tilde{W}^2$, and a weighting coefficient with the lowest row index has the highest priority; for a priority of the antenna port group index, a priority of the weighting coefficient in the strong polarization direction is higher than a priority of the weighting coefficient in the weak polarization direction; and the priority of the layer index refers to that a weighting coefficient with the lowest layer index has the highest priority; and
wherein the partial precoding information is discarded according to the priority order comprises: amplitude information of part of the weighting coefficients having the lowest priority and phase information of the part of the weighting coefficients having the lowest priority are discarded.

8. An electronic apparatus, comprising a memory and a processor, wherein the memory stores a computer program, and the processor is configured to execute the computer program to perform the following steps:
calculating, by a first communication node, actual channel state information, and transmitting first-type signaling to a second communication node; wherein a resource for transmitting the first-type signaling is less than a resource required for transmitting the actual channel state information, and partial precoding information in the actual channel state information is discarded according to a priority order;
wherein precoding information comprises weighting coefficient information of each layer; characterized in that, the weighting coefficient information of each layer comprises: bitmap information, amplitude information of weighting coefficients, phase information of the weighting coefficients and an index position of a weighting coefficient reference amplitude, wherein the weighting coefficients are a weighting coefficient of a first basis vector and a weighting coefficient of a second basis vector; and amplitude information and phase information of a weighting coefficient indicated by the index position of the weighting coefficient reference amplitude of each layer do not to be fed back;
wherein the bitmap information, the amplitude information of the weighting coefficients, and the phase information of the weighting coefficients each are ordered according to an order of priorities of an index of the second basis vector, an index of the first basis vector, an antenna port group index and a layer index from high to low; wherein the index of the second basis vector corresponds to a column index of a matrix $\tilde{W}^2$, and a weighting coefficient with the lowest column index has the highest priority; the index of the first basis vector corresponds to a row index of the matrix $\tilde{W}^2$, and a weighting coefficient with the lowest row index has the highest priority; for a priority of the antenna port group index, a priority of the weighting coefficient in the strong polarization direction is higher than a priority of the weighting coefficient in the weak polarization direction; and the priority of the layer index refers to that a weighting coefficient with the lowest layer index has the highest priority; and
wherein the partial precoding information is discarded according to the priority order comprises: amplitude information of part of the weighting coefficients having the lowest priority and phase information of the part of the weighting coefficients having the lowest priority are discarded.

9. The method of claim 1, wherein a lower index of the second basis vector of a weighting coefficient has a higher priority, a lower index of the first basis vector of a weighting coefficient has a higher priority and a lower layer index of a weighting coefficient has a higher priority.

10. The method of claim 1, wherein the partial precoding information comprises the amplitude information of the part of weighting coefficients, the phase information of the part of the weighting coefficients and part of bitmap information.

11. The method of claim 10, wherein the amplitude information of the part of the weighting coefficients, the phase information of the part of the weighting coefficients and the part of bitmap information are discarded according to the priority order; and
wherein the priority order comprises discarding the amplitude information of the part of the weighting coefficients having the lowest priority, the phase information of the part of the weighting coefficients having the lowest priority, and the part of bitmap information having the lowest priority so that the resource for transmitting the first-type signaling is sufficient to transmit remaining actual channel state information.

12. The method of claim 11, wherein the amplitude information of the part of the weighting coefficients having the lowest priority, the phase information of the part of the weighting coefficients having the lowest priority, and the part of bitmap information having the lowest priority each are determined according to the order of a priority of the index of the second basis vector, a priority of the index of the first basis vector, a priority of the antenna port group index, and a priority of the layer index from high to low.

13. The method of claim 12, wherein a lower index of the second basis vector of a weighting coefficient has a higher priority, a lower index of the first basis vector of a weighting coefficient has a higher priority and a lower layer index of a weighting coefficient has a higher priority.

* * * * *